US011017242B2

(12) United States Patent
Bruso et al.

(10) Patent No.: US 11,017,242 B2
(45) Date of Patent: May 25, 2021

(54) SYSTEM AND METHOD USING COMPLEX CENTROIDS FOR DETECTING OBJECT-OF-INTEREST SPEEDS FROM TWO DIMENSIONAL PICTURES

(71) Applicants: Kelsey L Bruso, Eagan, MN (US); Dayln Limesand, Inver Grove Heights, MN (US); James Combs, Eustace, TX (US)

(72) Inventors: Kelsey L Bruso, Eagan, MN (US); Dayln Limesand, Inver Grove Heights, MN (US); James Combs, Eustace, TX (US)

(73) Assignee: Unisys Corporation, Blue Bell, PA (US)

( * ) Notice: Subject to any disclaimer, the term of this patent is extended or adjusted under 35 U.S.C. 154(b) by 160 days.

(21) Appl. No.: 16/278,808

(22) Filed: Feb. 19, 2019

(65) Prior Publication Data
US 2020/0265241 A1 Aug. 20, 2020

(51) Int. Cl.
*G06K 9/00* (2006.01)
*G06T 7/246* (2017.01)

(52) U.S. Cl.
CPC .......... *G06K 9/00785* (2013.01); *G06T 7/246* (2017.01); *G06T 2207/30236* (2013.01)

(58) Field of Classification Search
None
See application file for complete search history.

(56) References Cited

U.S. PATENT DOCUMENTS

2010/0092043 A1* 4/2010 Borman .................... G06T 7/20
382/107
2019/0266733 A1* 8/2019 Yang ................ H04N 21/44008

* cited by examiner

*Primary Examiner* — Justin P. Misleh

(57) ABSTRACT

A traffic monitoring system includes a first car moving on a first path; a camera having a field of vision including at least a portion of the first path; and a computing system. The computing system receives a plurality of images from the camera. The computing system has a processor. When instructed, the processor performs circling a perimeter of the first car on each of the images with a first rectangle; composing a first set of points, each point of the first set of points representing a center of the first rectangle; finding a first centroid using the first set of points, wherein the first centroid represents the first path; and calculating a speed of the first car using the first centroid.

17 Claims, 51 Drawing Sheets

(34 of 51 Drawing Sheet(s) Filed in Color)

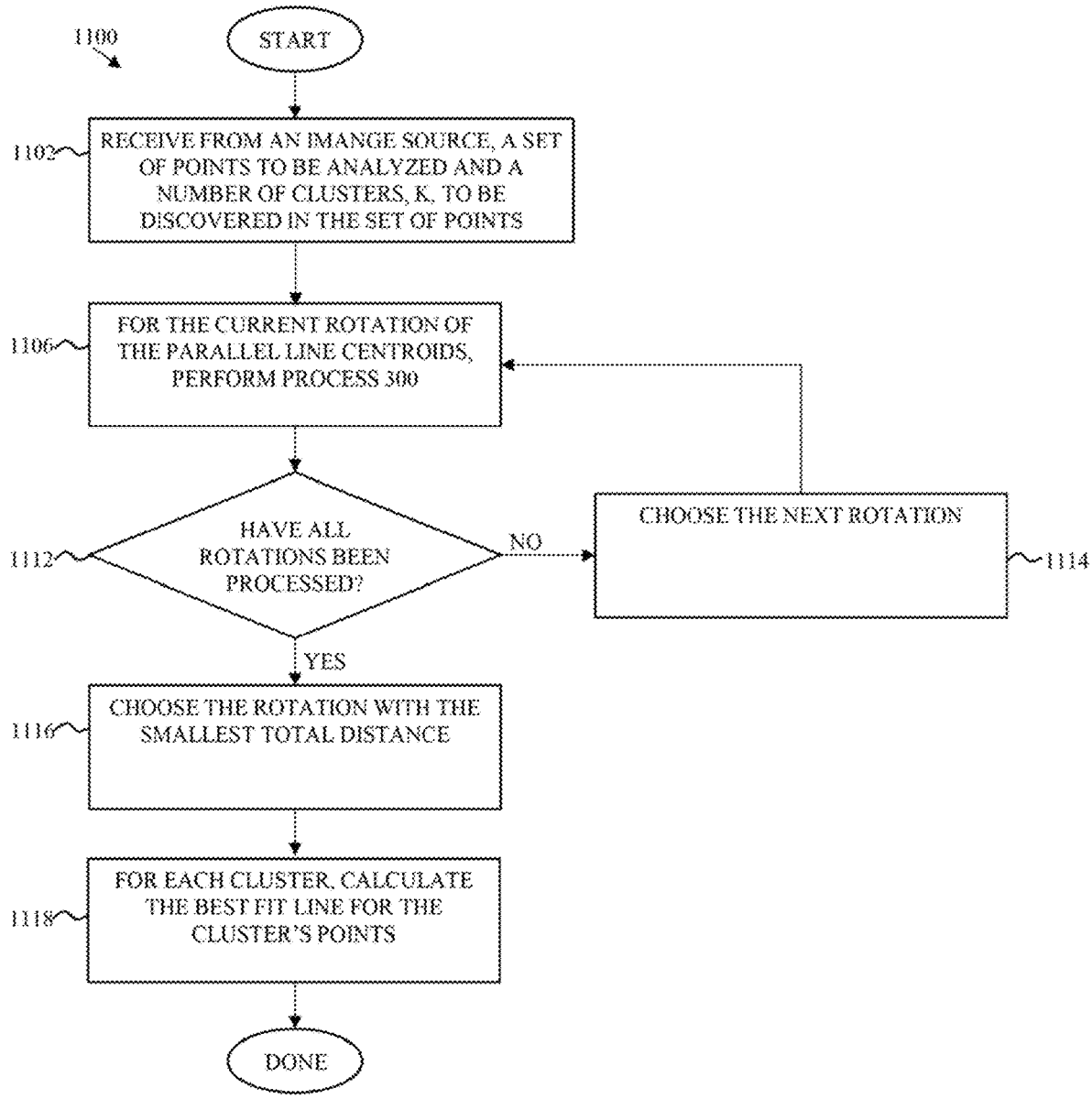

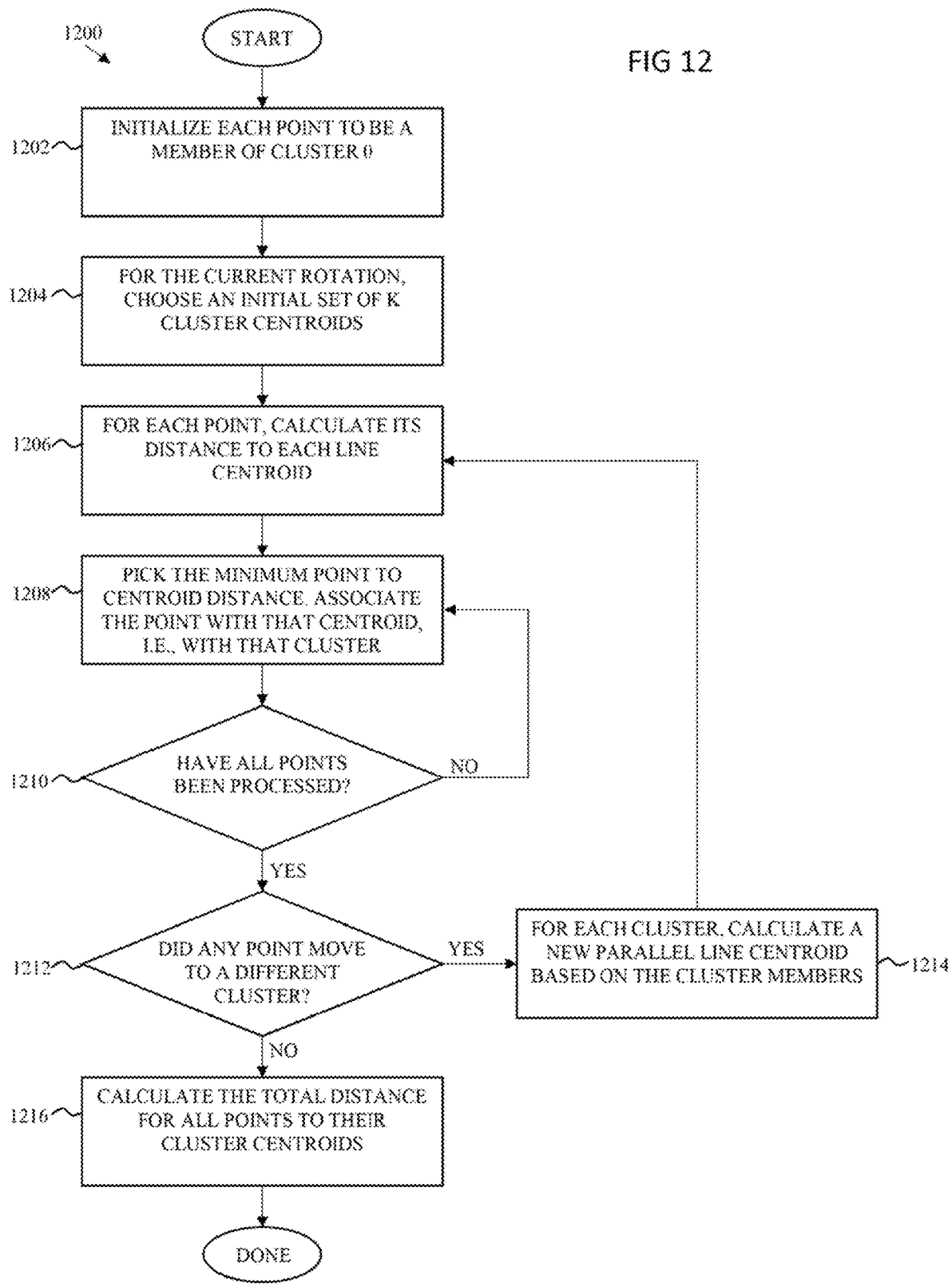

FIG 26. Rotation for θ = -45

FIG 27. Rotation for θ = -135

FIG 28. Rotation for θ = 0

FIG 29. Rotation for θ = -45

FIG 30. Rotation for θ = -90

FIG 31. Rotation for θ = -135

FIG 32. Rotation for θ = -180

FIG 33. Parabola centroids with rotation θ = 0

FIG 34. Parabola centroids with rotation θ = 60

FIG 40. Clustering with Parabola centroids θ =60 and a=0.01

FIG 41. Parabolic Clustering with θ = 60 and a=1.0

FIG 42. Polynomial Centroid with rotation θ = 0

FIG 43. Radial Line Centroids – One Point Overlap

FIG 44. Radial Line Centroids – One Line Overlap

| Atoms | RMSD distance |
|---|---|
| 0,0 | 50.09 |
| 7,0 | 47.39 |
| 4,0 | 39.80 |
| 10,0 | 43.40 |
| 5,5 | 56.64 |
| 7,0 | 79.60 |
| 5,5 | 77.97 |
| 6,6 | 64.40 |

Table 1

FIG. 48

Table 2 Using Delta Values

| Intersect Line | Slope of perpendicular line | x direction | y direction |
|---|---|---|---|
| TL | ≥0 | - | - |
| TL | <0 | + | - |
| BL | ≥0 | + | + |
| BL | <0 | - | + |
| LL | ≥0 | + | + |
| LL | <0 | + | - |
| RL | ≥0 | - | - |
| RL | <0 | - | + |

FIG. 49

Table 3 Centroids and Data Dimensionality

| | Data Dimensionality | | | |
|---|---|---|---|---|
| | 1D | 2D | 3D | nD |
| Centroid Types | point | point | point | point |
| | | line | line | line |
| | | | lines on parallel planes² | lines on parallel planes² |
| | | | plane | plane |
| | | | | hyperplane |
| | | parabola | parabola (multiple parabola centroids on a single plane) | parabola (multiple parabola centroids on a single plane) |
| | | | paraboles on parallel planes² | paraboles on parallel planes² |
| | | | paraboloid | paraboloid |
| | | | | nD paraboloid |
| | | hyperbola | hyperbola (multiple hyperbola centroids on a single plane) | hyperbola (multiple hyperbola centroids on a single plane) |
| | | | hyperbola centroids on parallel planes² | hyperbola centroids on parallel planes² |
| | | | hyperboloid | hyperboloid |
| | | | | nD hyperboloid |
| | | polynomial curve | polynomial curve (multiple polynomial curve centroids on a single plane) | polynomial curve (multiple polynomial curve centroids on a single plane) |
| | | | polynomial curve centroids on parallel planes² | polynomial curve centroids on parallel planes² |
| | | | polynomial surface | polynomial surface |
| | | | | nD polynomial surface |

FIG. 50

SYSTEM AND METHOD USING COMPLEX CENTROIDS FOR DETECTING OBJECT-OF-INTEREST SPEEDS FROM TWO DIMENSIONAL PICTURES

FIELD OF THE DISCLOSURE

The instant disclosure relates generally to detect object-of-interest speeds from pictures. More specifically, this disclosure relates to embodiments of apparatuses, systems, and methods that implement computational methods using complex centroids for detecting object-of-interest speeds from two dimensional pictures.

BACKGROUND

The most common way to identify a speeding violation is for an officer to use a microwave, radar or laser device to bounce signals off a moving vehicle to estimate vehicle speed. While an officer that is physically present at a scene can observe and accurately determine if violations occur, violation detection methods that require an officer to be present to identify a violation have a number of shortcomings. Most importantly, the effectiveness of any method which requires an officer to be present when a speeding violation occurs is limited by personnel physical availability. In addition, the speed detection devices require frequent calibration to maintain its accuracies.

With traditional speed sensing devices, it is particularly difficult to precisely pinpoint which vehicle a reading comes from when several vehicles are traveling closely together, one behind the other or next to one another, in the field of vision of the device.

Furthermore, when a speeder is detected, the officer that identifies the speeder must usually chase, stop and approach the speeder to issue a citation. The chasing activity is dangerous to the public as well as potentially life threatening to the law enforcement officer and requires too much of an officer's valuable time for a single citation. Because every offender must be stopped individually, it is impossible for a single officer to issue citations to every offender in an area that is monitored.

The embodiments disclosed herein provide an automated system that can detect speeds of vehicles from images taken by any traffic cameras. No police officer is required to be present. No physical car chasing is required. The embodiments disclosed herein are able to detect vehicle speeds even if multiple vehicles are travelling in parallel. The embodiments disclosed herein are self-calibrating every time when images are processed. Requirement of machine calibrations is reduced, if not eliminated.

SUMMARY

The embodiments disclosed herein provide an automated system that can detect speeds of vehicles from images taken by any traffic cameras. FIG. 2 shows an example of a picture taken by a traffic monitoring camera.

A standard freeway lane in the United States is 12 feet. Thus, by extension, the distance between any two cars traveling in side by side lands on a road is also 12 feet. It is noted, the embodiments disclosed herein do not use the lane markers or lane strips as references, because they are not always available. For example, lane markers and lane strips can be covered in snow. See FIG. 3 for example.

In one embodiment, the vehicles are tracked in a series of images, also known as frames, taken by traffic cameras using bounding boxes 402 as shown in FIG. 4A. Over a sequence of video frames, a set of points which represent the center points of the bounding boxes 402 for the vehicles can be traced, as shown in the dots in FIG. 4B.

A set of best fit curves can be found to represent traces of the centers of vehicles. See FIG. 5 for example. In FIG. 5, the distance between lines A and B is 12 feet, and the distance between C and D is also 12 feet. It can be further asserted that for any value on the Y axis, the distance between curve A and curve B is 12 feet. However, the number of pixels that represent 12 feet in the foreground is different from (greater than) the number of pixels that represent 12 feet in the background. Knowing the frame rate of the video and applying various computational methods, we can calculate that when vehicle V appears at location $(x_1,y_1)$ on curve A in frame $f_1$ and appears at location $(x_2,y_2)$ on curve in frame $f_2$, the vehicle's speed is h. That is the ultimate goal of this research effort.

According to one embodiment of the disclosure, a traffic monitoring system includes a first car moving on a first path and a camera having a field of vision including at least a portion of the first path. A computing system receives a plurality of images from the camera. The computing system has a processor. When instructed, the processor performs the followings steps: circling a perimeter of the first car on each of the images with a first rectangle; composing a first set of points, each point of the first set of points representing a center of the first rectangle; finding a first centroid using the first set of point, wherein the first centroid represents the first path; and calculating a speed of the first car using the first centroid.

According to one embodiment of the disclosure, a computing system includes a non-transitory computer-readable medium comprising instructions which, when executed by a processor of the computing system, causes the processor to perform the steps of: receiving a plurality of images taken by a traffic camera, the images includes a first car moving on a first path; circling a perimeter of the first car on each of the images with a first rectangle; composing a first set of points, each point of the first set of points representing a center of the first rectangle; finding a first centroid using the first set of point, wherein the first centroid represents the first path; calculating a speed of the first car using the first centroid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the disclosed systems and methods, reference is now made to the following descriptions taken in conjunction with the accompanying drawings.

FIG. 11 shows a K-Means clustering process for use with line centroids according to one embodiment of the disclosure.

FIG. 12 shows a K-Means clustering process for use with line centroids according to one embodiment of the disclosure.

FIG. 48 is a Table showing experimental results for the eight slopes according to one embodiment of the disclosure.

FIG. 49 is a Table that uses delta values and shows the intersect line and slope of perpendicular direction according to one embodiment of the disclosure.

FIG. 50 is a Table showing the applicable centroid types and the dimensionality of the data to support the centroid type according to one embodiment of the disclosure.

DETAILED DESCRIPTION

Figure 1:
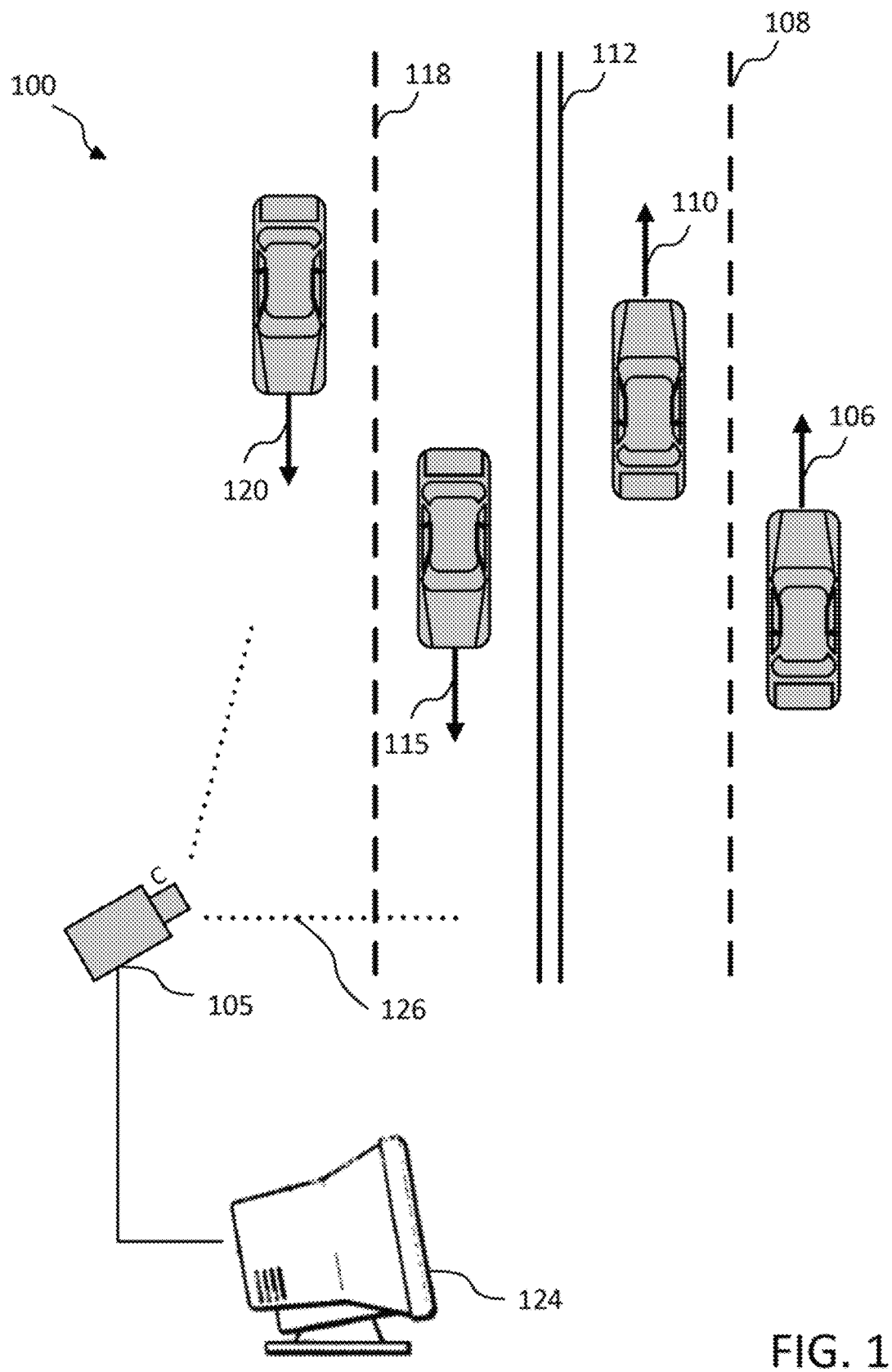
FIG. 1 shows a schematic view of a traffic monitoring system according to one embodiment of the disclosure.

FIG. 1 shows a schematic view of a traffic monitoring system 100 according to one embodiment of the disclosure. The system 100 includes a camera 105 with a field of vision 126. The camera 105 is connected, to a computer 124. The computer 124 includes processors that may process the images taken by the camera.

Figure 2:
FIG. 2 shows an example of a picture taken by a traffic monitoring camera according to one embodiment of the disclosure.
Figure 3:
FIG. 3 shows an example of a picture that lane marks are covered by snow according to one embodiment of the disclosure.

The system 100 further includes a plurality of traffic lanes 106, 110, 115, 120. The traffic lanes 106, 110, 115, 120 are the paths of the moving cars. The system 100 further includes, lane markers 108, 112, 118. The camera 105 may take a series of pictures with a fix time interval, e.g., 1-10 millisecond. The camera 105 may take a picture as shown in FIG. 2. The computer 124 may implement all the methods and processors disclosed herein for traffic monitoring.

Figure 6:
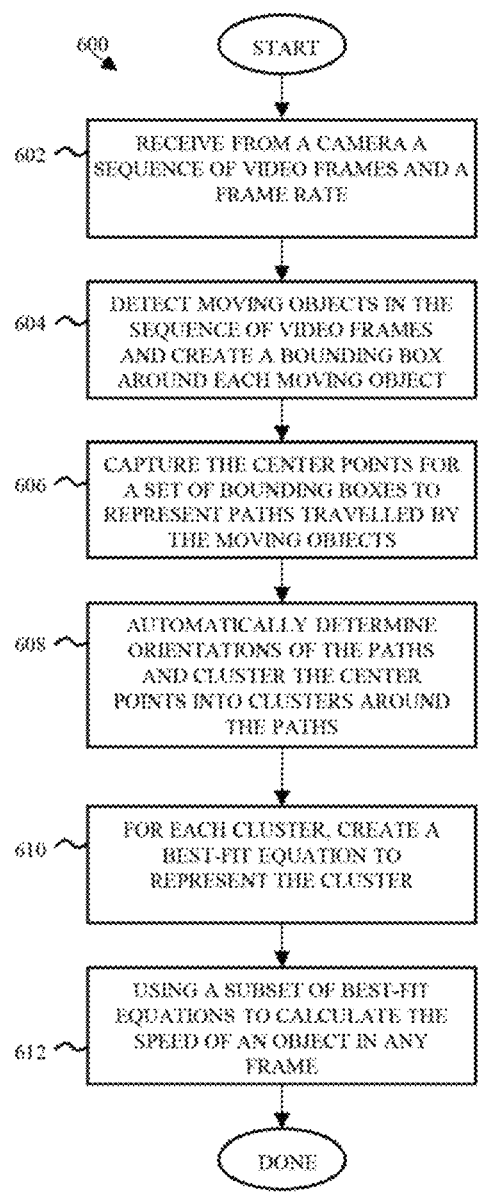
FIG. 6 shows a process of determining a speed of a moving object according to one embodiment of the disclosure.

FIG. 6 shows a process 600 of determining a speed of a moving object according to one embodiment of the disclosure. One embodiment includes 608 and creates a simplistic solution for 610. A separate embodiment covers the other steps. At 602, a sequence of video frames and a frame rate is received from a camera. At 604, moving objects in the sequence of video frames is detected and a bounding box around each moving object is created. At 606, the center points are captured for a set of bounding boxes to represent paths travelled by the moving objects. At 608, orientations of the paths are automatically determined, and the center points are clustered into clusters around the paths. At 610, for each cluster, a best-fit equation is created to represent the cluster. At 612, a subset of best-fit equations is used to calculate the speed of an object in any frame. In one embodiment, "paths" in process 600 may be understood as lanes of traffic. The embodiments disclosed herein, however, are not limited to traffic analysis but applies broadly to any set of points in 1D, 2D, or nD space which exhibit these elongated, "hot dog" cluster shapes.

In the traffic analysis case, because the traffic cameras can be moved (pan, tilt, and zoom) by remote operators, process 600 must be repeated after each movement.

The K-Means clustering technique can be used for the embodiments disclosed herein. K-Means technique can require as input the number of clusters to be discovered in the data set. This number is often called K. It needs an initial set of K "centroid values" to use as the "seed" center points for each cluster.

Depending on the centroid values chosen, the result of K-Means or expectation minima (EM) clustering may or may not converge. The algorithm is converged when the assignments of points to clusters no longer change. Clustering techniques may produce clusters that do not overlap, i.e., each point in the data set associates with exactly one cluster. The Fuzzy K-Means and other statistical techniques allow, each point to associate with one or more clusters with an associated probability of the accuracy of the association.

Figure 7:
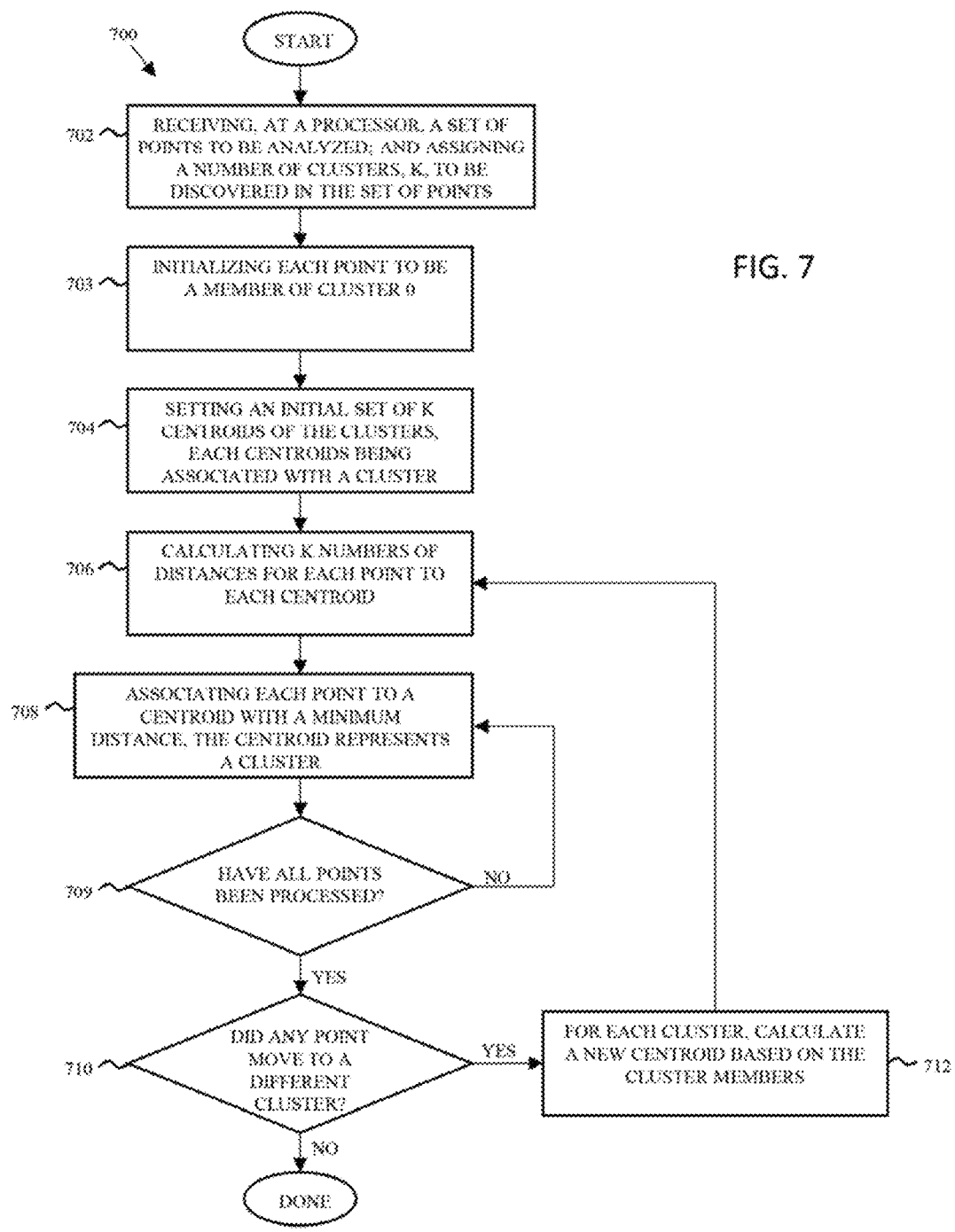
FIG. 7 shows a method associating a point to be analyzed to a cluster according to one embodiment of the disclosure.

FIG. 7 shows a method 700 associating a point to be analyzed to a cluster according to one embodiment of the disclosure. The method 700 begins at 702, receiving, at a processor, a set of points to be analyzed. Assigning a number of clusters, K, to be discovered from the set of points. The value K can be a positive integer arbitrarily assigned, e.g. 1, 2, 3, 4, 5, etc.

The goal of the clustering is to associate each point to a cluster, each of whose members is most like the other members of the cluster and most "unlike" the members of other clusters. At 703, one embodiment initializes all points to be members of cluster 0. Any initialization mechanism can be used.

The method 700 selects an initial set of K centroids to be the seed points at 704. In some prior art implementations of K-Means, the embodiment calculates the distance between each point in the set and each centroid 706. The algorithm chooses the minimum distance and associates the point with that centroid i.e., associates the point with the cluster defined by that centroid 708. Repeat until each point has been associated with a cluster 709.

At 710, in one embodiment, determine if any points have become associated with a different cluster. If not, the clustering is complete. It so, recalculate the set of centroids 712 and return to step 706. Another embodiment uses a change to the summed total distance between all centroids and their cluster members. Yet another embodiment uses an iteration count. The clustering is declared complete after a predetermined number of iterations have occurred. This avoids infinite loops for the situation where the K-Means algorithm does not converge.

At 712, one embodiment selects the mean value for each cluster as the new centroid. Another embodiment chooses the member of the cluster nearest the mean value for the cluster as the new centroid.

Figure 8:
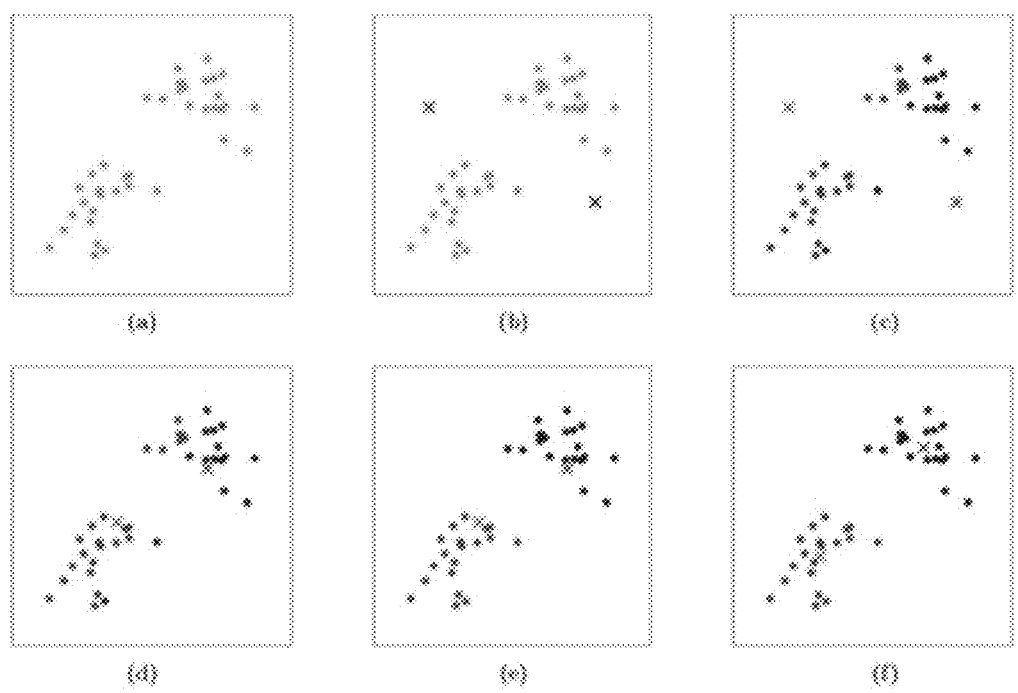
FIG. 8 shows an example of how K-Means clustering works as in method 700 according to one embodiment of the disclosure.

FIG. 8 shows an example of how K-Means clustering works as in method 700 according to one embodiment of the disclosure. Panel (a) of FIG. 8 shows the original data set, with each point associated with the green cluster (step 703 above). Panel (b) shows the K=2 initial seed centroid values—a red x and a blue x (step 704). Panel (c) shows the first iteration of clustering, associating each point with its nearest centroid value (steps 708 and 709). Since at least one point changed its association to a different cluster (step 710), calculate new centroid values as shown in Panel (d) (step 712) and recalculate distances (step 706) and choose the nearest centroid for each point (steps 708 and 709) as shown in Panel (e). Panel (f) shows the recalculation of the centroid values (step 712) and abbreviates the steps 706 through 710. No points changed their associations to a different cluster (step 710), so the processing terminates.

Figure 4A:
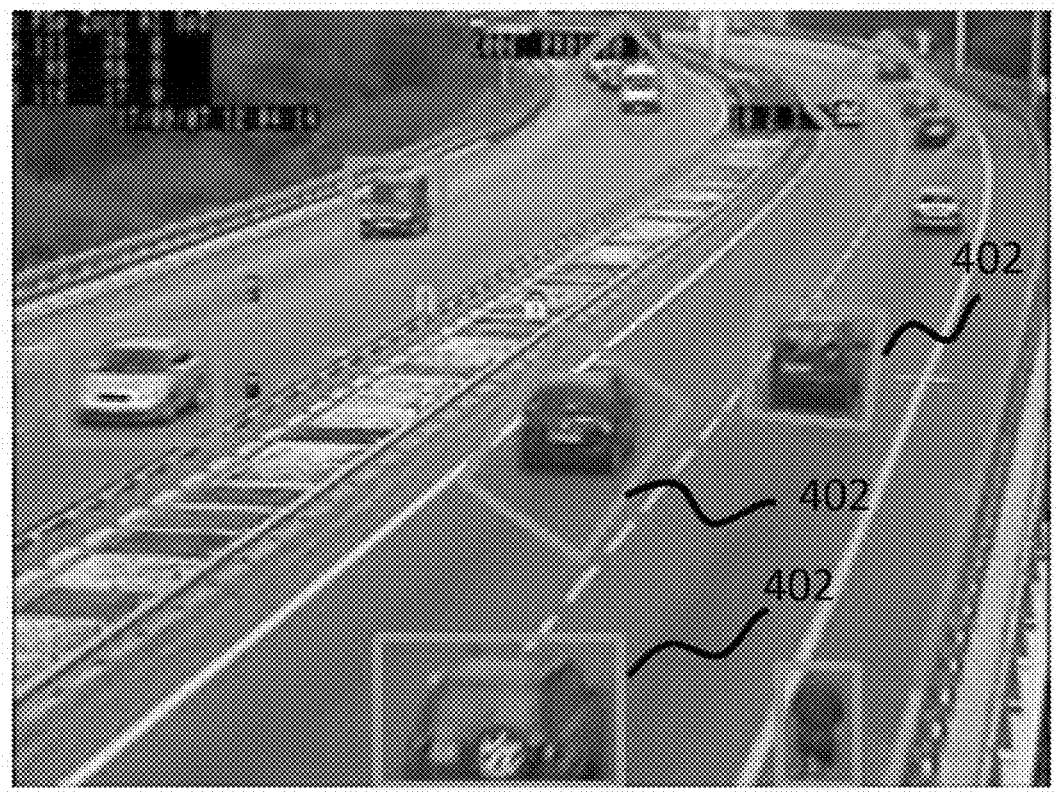
FIG. 4A shows a picture wherein the vehicles are surrounded by rectangular boxes according to one embodiment of the disclosure.
Figure 4B:
FIG. 4B shows a picture wherein the dots represent traces of the center points of the rectangular boxes shown in FIG. 4A according to one embodiment of the disclosure.

A video camera, in this case mounted on a pole, captures the flow of traffic on a segment of highway as shown in FIG. 4A. Individual vehicles can be identified in the video, enclosed in a bounding box, and tracked from frame to frame. Across the set of frames in a video, the video analysis captures the center point for each bounding box to assemble a set of points that indicate the position of each vehicle over time. FIG. 4B shows an example set of 3063 points extracted from a traffic camera video excerpt.

Figure 5:
FIG. 5 shows a picture wherein the lines represent best fit curves of the traces of the center points shown in FIG. 4B according to one embodiment of the disclosure.

As shown in FIG. 4B and FIG. 5, a traffic researcher can assert that there are four lanes of traffic in this set of points. In clustering terms this implies that the number of clusters, K, to be discovered is four, thus K=4. There is no existing techniques can automatically detect the four lanes. The embodiments disclosed herein provide solutions to automatically detect the four lanes.

Figure 9:
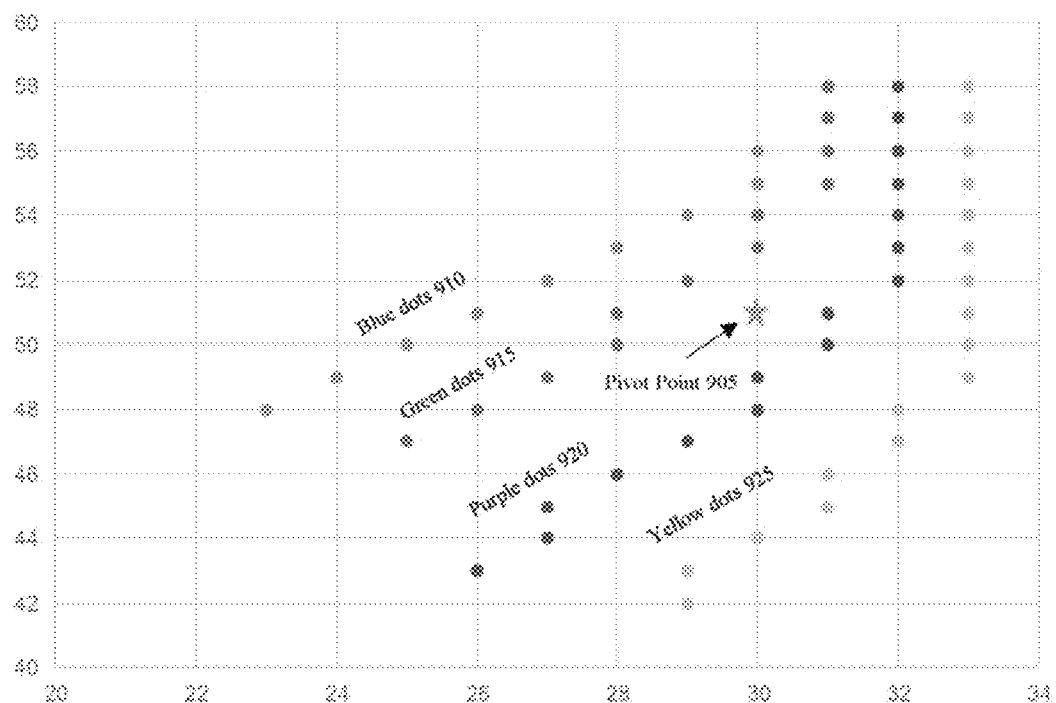
FIG. 9 shows a subset of the points that approximate the traffic shape according to one embodiment of the disclosure.

FIG. 9 shows a subset of the points that approximate the traffic shape according to one embodiment. FIG. 9 shows the arithmetic average of the points as a blue star. The colors of the points indicate the ideal clustering outcome with each color representing one cluster. In FIG. 9, there are four clusters, K=4. FIG. 9 show the first cluster, blue dots 910; the second cluster, green dots 915; the third cluster, purple dots 920; and the fourth cluster, yellow dots 925. The pivot point 905 is the arithmetic average of all points in all clusters.

From such a set of points shown in FIG. 9, there are three analytical challenges: (1) automatically determining the initial set of lane center points (centroids in clustering terminology) to get the best result; (2) automatically determining the orientation of the traffic lanes; (3) Automatically determine the center of each traffic lane i.e., the best-fit centroid for each cluster.

In one embodiment, for the first problem (automatically determining the initial set of lane center points (centroids in clustering terminology) to get the best result), use an approximation for the shape of the clusters to be discovered, for example a line. Then, extend the clustering idea of cluster centroids from "points" to "lines", thus changing the shape of the clusters from round to elongated. Thus, the cluster centroids can be a point, a straight line, a curved line, or a surface. Specifically, in the example of FIG. 9, the cluster centroids for the clusters are lines. There are four clusters, K=4, thus there are four lines representing the cluster centroids. Each cluster centroid associated with one cluster.

Figure 10A:
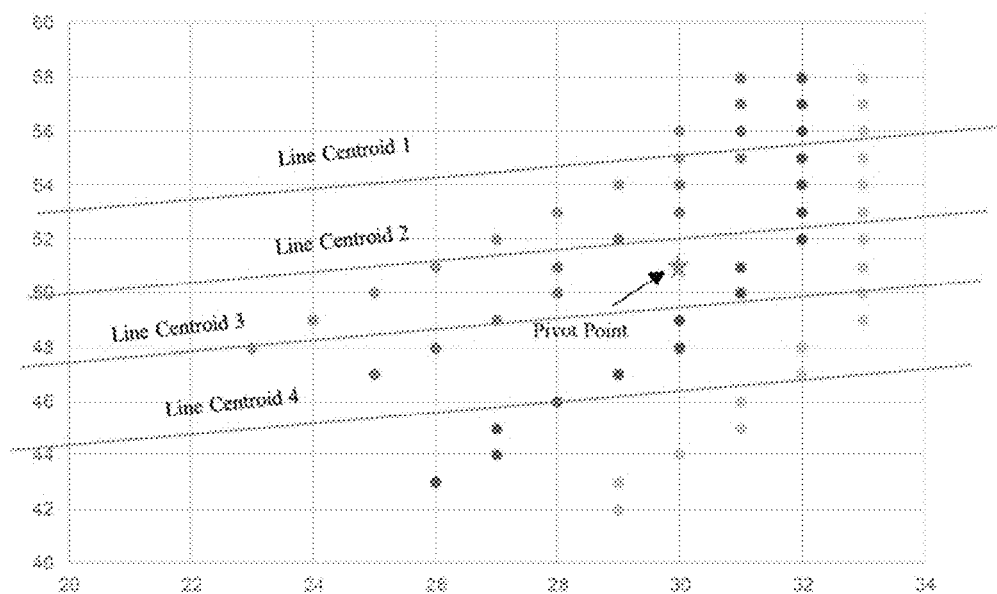
FIG. 10A shows a method to identify initial K centroids according to one embodiment of the disclosure.

FIG. 10 shows a method to identify initial K centroids according to one embodiment. To identify the starting set of K centroids, one embodiment uses an arithmetic average to find the middle of the set of points. Hereinafter we refer to this point as the "pivot point". The mechanism then creates K parallel lines evenly distributed across the set of points.

Recall that the slope-intercept formula for a line is $y=mx+b$ where m is the slope of the line and b is the y-intercept. If we Choose an initial slope of 0.5, the K=4 line centroids are similar to those shown in FIG. 10A.

For the second problem (automatically determining the orientation of the traffic lanes), by extending the clustering technique from points to lines means extending the idea from non-directional to directional. The direction or orientation of the line centroids matters.

Figure 10B:
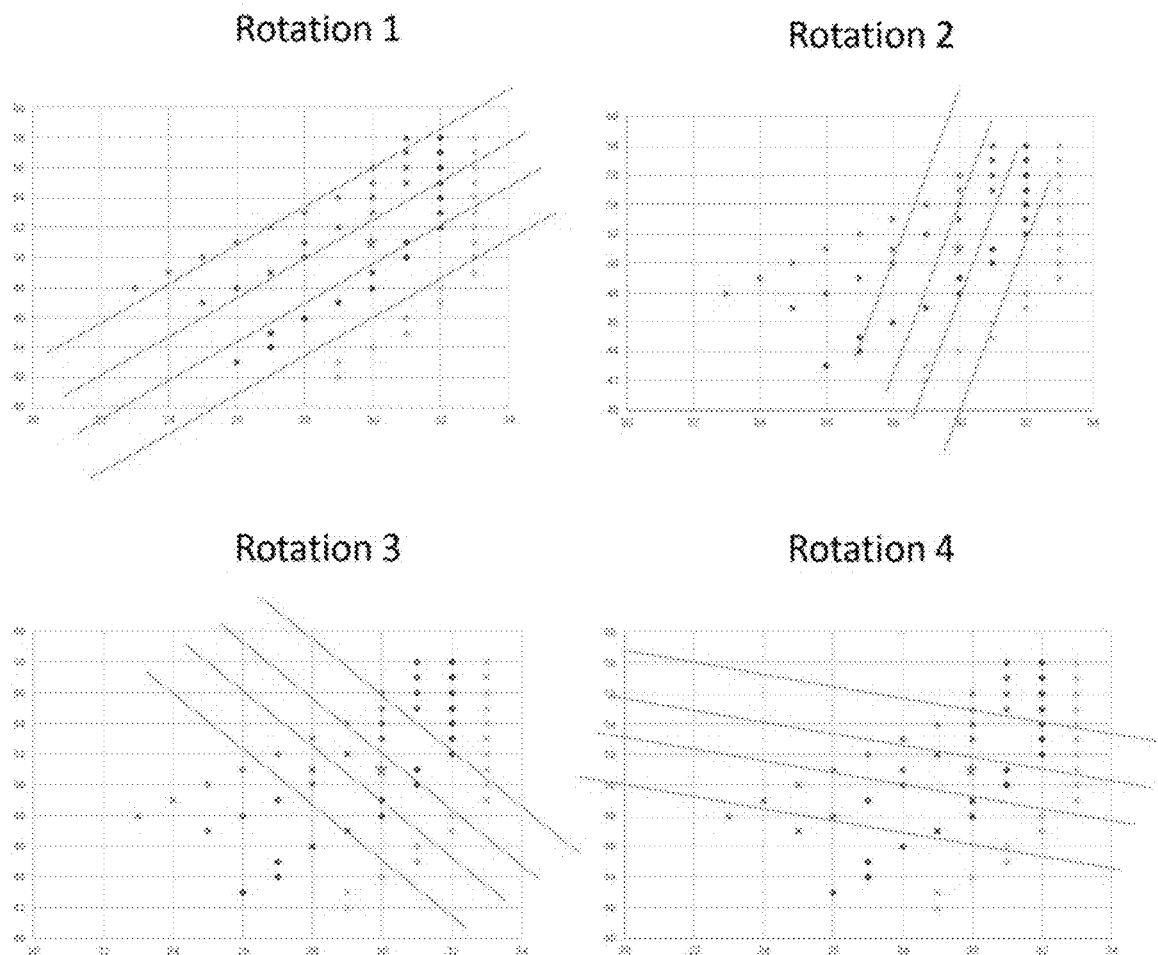
FIG. 10B shows four possible rotations for the line centroids according to one embodiment of the disclosure.

On embodiment of the disclosure addresses the second problem by rotating the line centroids a user-chosen number of times, as shown in FIG. 10B. At each rotation, the clustering mechanism assigns each point to its nearest line centroid to form the set of K clusters. It then calculates the total distance for each point to its cluster line centroid. FIG. 10B illustrates the rotations. Note that each rotation is around the pivot point, indicated by the blue star.

Suppose the user chose 7 rotations plus the original orientation for analysis. Table 1 FIG. 48 shows experimental results for the eight slopes (7 for rotations and 1 for the initial set) for the subset of points. The smallest total distance between each centroid and its cluster members is 39.80 for a slope of 2. The clustering mechanism chooses this slope and this set of line centroids as the best approximation for the orientation of the lanes. FIG. 10B (Rotation 1) illustrates the case for slope, m=2.

For the third problem (determining, the best centroid for each cluster), extend the distance measurement technique used in clustering between a point and point centroid to a point and line centroid. Also, extend the centroid optimization phase of the clustering from point centroid optimization to line centroid optimization.

FIG. 11 shows a K-Means clustering process for use with line centroids according to one embodiment. At step 1102, receive the set of points and number of clusters K from an image source. At steps 1106, 1112, and 1114 perform the detail clustering process 1100 for each of the rotations of the set of parallel line centroids. At step 1116 choose the rotation whose total cluster distance is the smallest. At step 1118, relax the requirement for the line centroids to be parallel and create a best fit for the line centroid for each cluster.

FIG. 12 shows a K-Means clustering process for use with line centroids according to one embodiment. With line centroids, step 1206 calculates the distance from each point in the set to each of the K=4 parallel line centroids. Step 1206 through step 1214 optimize the positioning of the set of parallel line centroids in the set of points. Step 1214 calculates the position for a new line centroid for each cluster, keeping the set of line centroids parallel, that is, keeping the slope for each line centroid the same. Step 1216 calculates the total distance for all points to their cluster centroid. Step 1216 in FIG. 12 uses the total distance from each rotation to choose the rotation with the minimum total distance.

Figure 13:
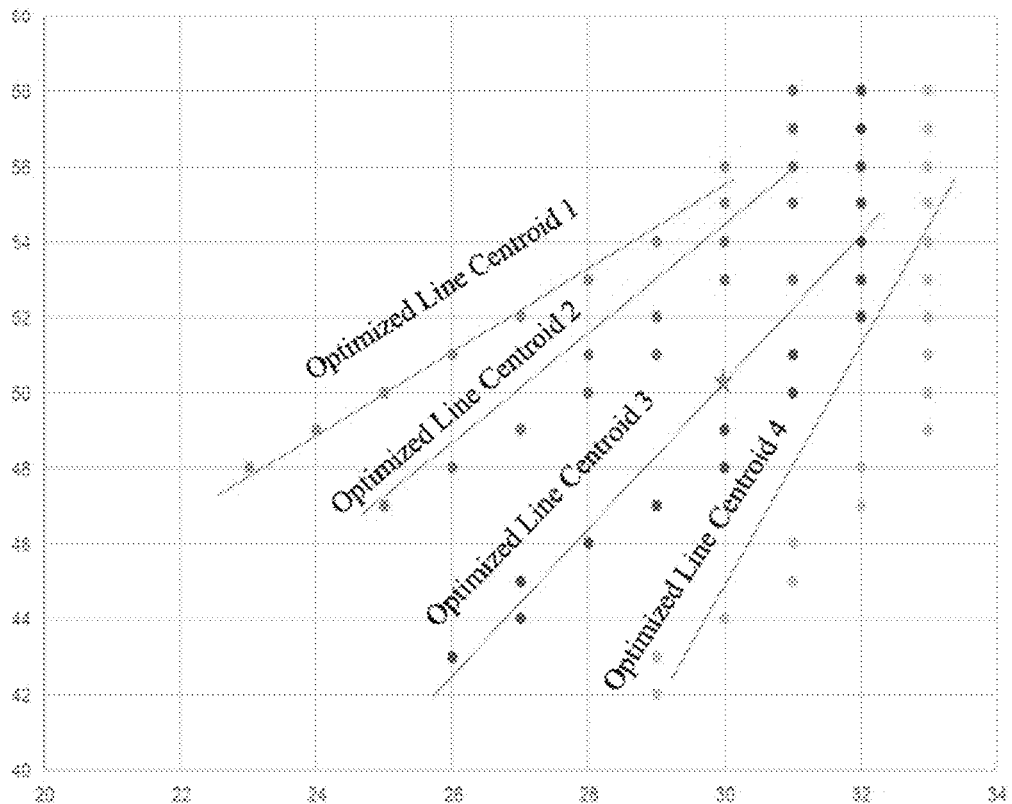
FIG. 13 shows a final result of optimizing both slope and shift parameters of each line centroid according to one embodiment of the disclosure.

After method 1200 which optimizes the slope parameter (m parameter of y=mx+b), the line centroid may be further optimized by adjusting its shift parameter (b parameter of y=mx+b) by going through the similar steps of finding the shift parameter that provides the minimum distances. See Table 1 in FIG. 48 for example. FIG. 13 shows a final result of optimizing both slope and shift parameters of each line centroid.

Figure 14:
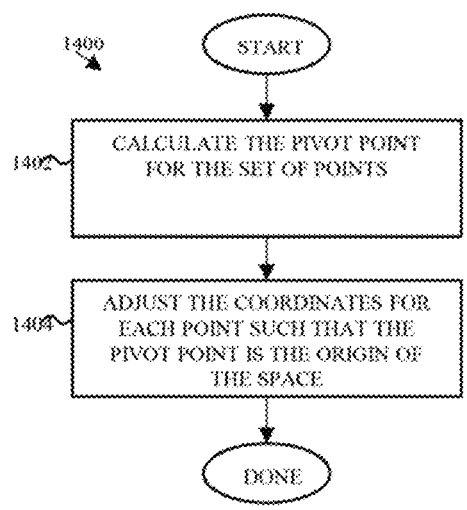
FIG. 14 shows a method for normalizing a set of points according to one embodiment of the disclosure.

FIG. 14 shows a method 1400 for normalizing a set of points.

At 1402, calculate the pivot point for the set of points. One embodiment uses an arithmetic average to find the middle of the set of n points, that is:

$$x_{pivot}=(x_1+x_2+\ldots+x_n)/n \text{ and } y_{pivot}=(y_1+y_2+\ldots+y_n)/n.$$

A second embodiment may use a point from the data set nearest to the arithmetic average as the pivot point. A third embodiment uses a midrange value, for example:

$$x_{pivot}=(x_{maximum}+x_{minimum})/2 \text{ and } y_{pivot}=(y_{maximum}+y_{minimum})/2 \text{ to calculate the pivot point.}$$

Another embodiment may use weighted average, that is:

$$x_{pivot}=(w_1x_1+w_2x_2+\ldots+w_nx_n)/n \text{ and } y_{pivot}=(w_1y_1+w_2y_2+\ldots+w_ny_n)/n.$$

At 1404, assign new coordinates to each point in the set, adjusted such that the pivot point is the origin of the point space. In this example, the origin is the two-dimensional point (0,0).

Figure 15:
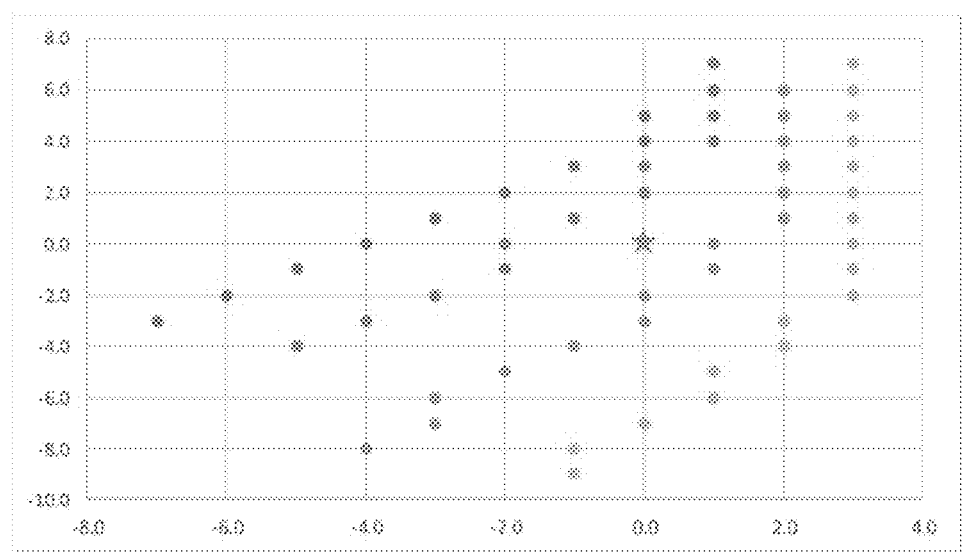
FIG. 15 shows the normalized points and their values according to one embodiment of the disclosure.

FIG. 15 shows the normalized points and their values. Again, the star indicates the pivot point which is also the origin.

Figure 16:
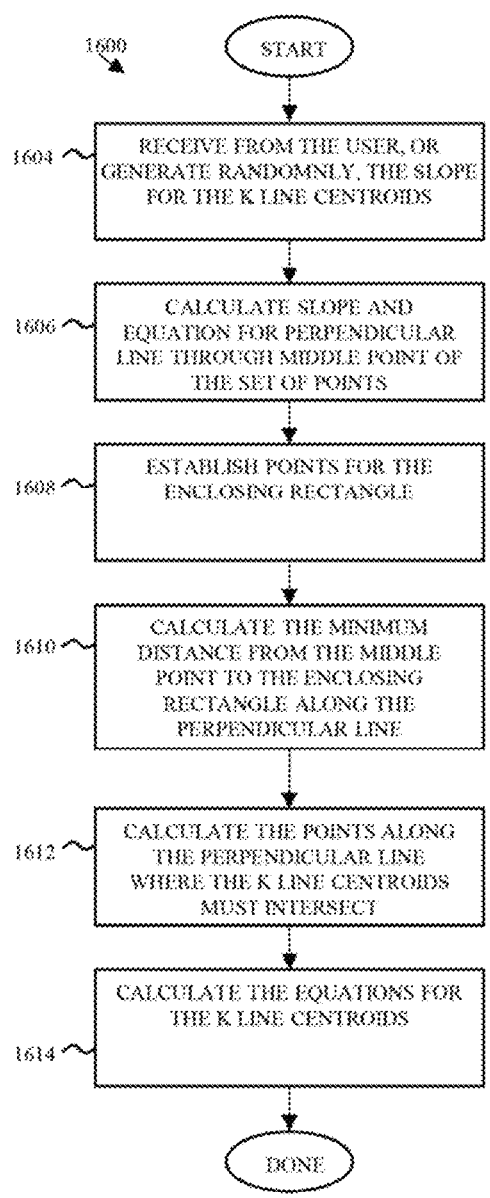
FIG. 16 shows how to create the initial set of K line centroids according to one embodiment of the disclosure.

FIG. 16 shows how to create the initial set of K line centroids according to one embodiment of the disclosure. Previously, receive the set of points to be clustered as well as the number of clusters, K, to discover in the set of points. The points may be normalize or unnormalized. In this example, the points have been normalized.

In one embodiment, at 1604, receive from the user the slope for the K line centroids to be generated. In another embodiment, if no slope is given by the user, use a default value. This example uses a default slope value of 0.5. This is shown in FIG. 17.

Figure 17:
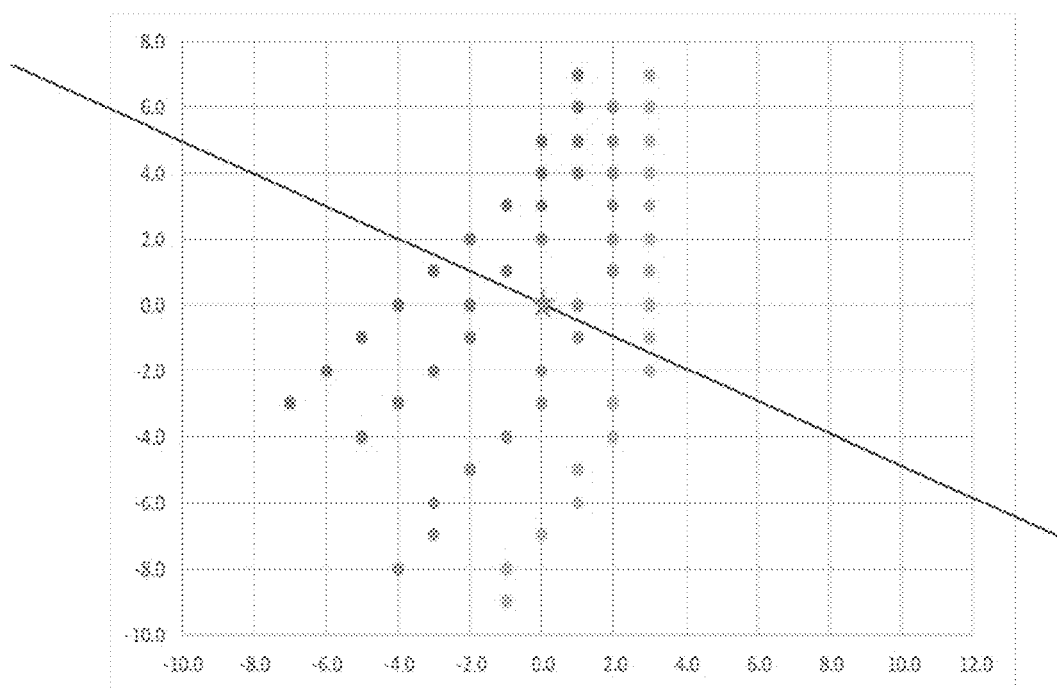
FIG. 17 shows an initial line through the origin with slope −0.5 according to one embodiment of the disclosure.
Figure 18:
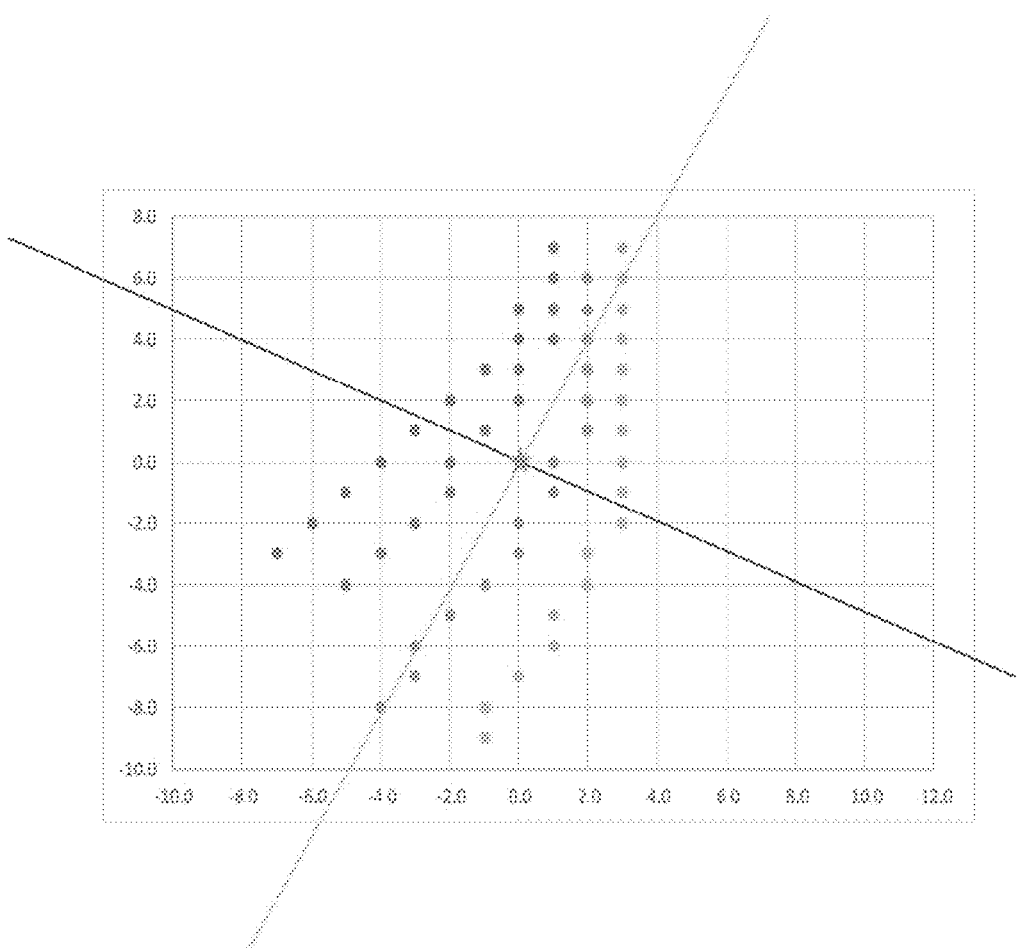
FIG. 18 shows an original line (black line) and a perpendicular line (yellow line).

FIG. 17 shows an initial line through the origin with slope −0.5 according to one embodiment of the disclosure. At 1606, calculate the slope and equation for a line which is perpendicular to the first line as shown in FIG. 18. The perpendicular line allows the mechanism to calculate the set of lines, parallel to the original line, which form the initial set of line centroids. The perpendicular to a line has a slope of $\text{slope}_{perpendicular} = -1/\text{slope}_{original}$. In this example, the original line has the equation:

$$y=-0.5x+0$$

and the perpendicular line has the equation:

$$y=2x+0.$$

Figure 19:
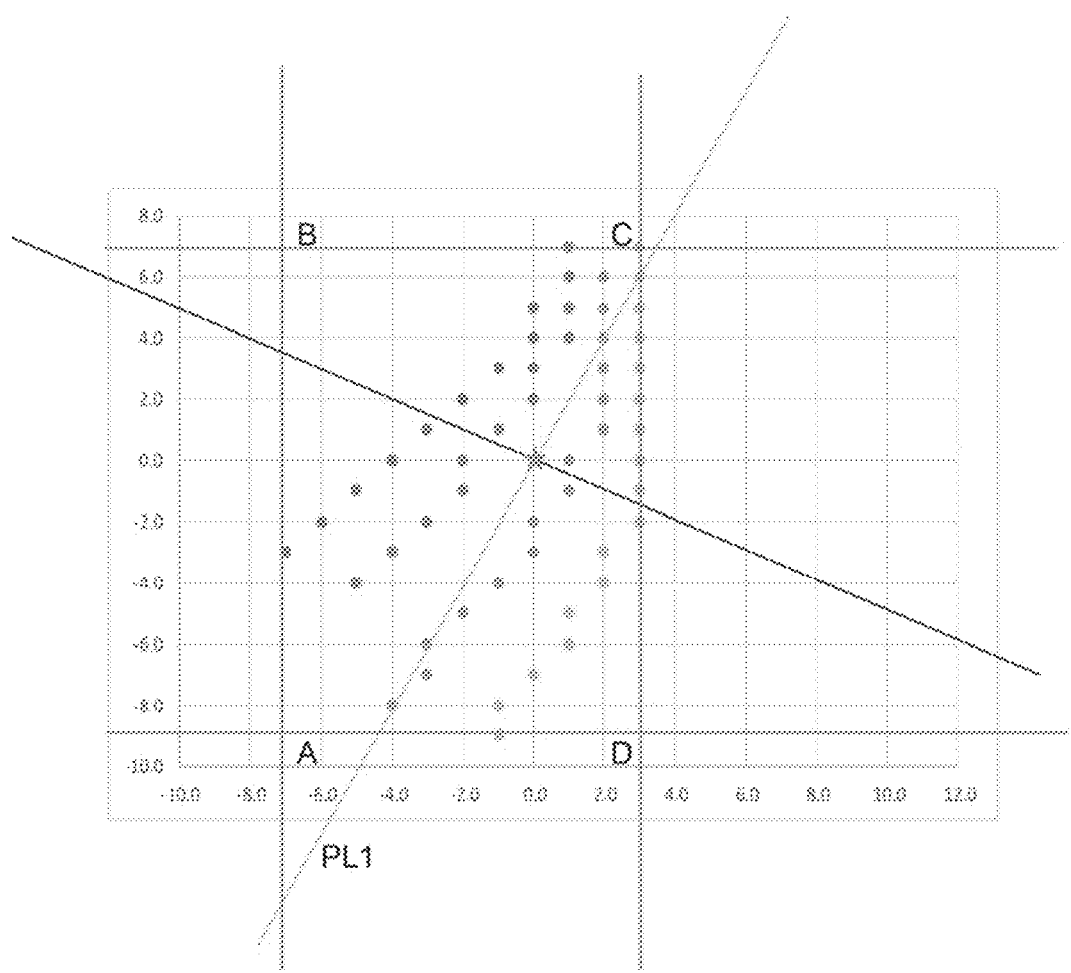
FIG. 19 show an enclosing rectangle according to an embodiment.

FIG. 18 shows an original line (black line) and a perpendicular line (yellow line). To assist in calculating the positions for the K line centroids, at 1608 create an enclosing rectangle as shown in FIG. 19. The corner points of the rectangle are:

($x_{Minimum}$, $y_{Minimum}$) which is Point A.
($x_{Minimum}$, $y_{Maximum}$) which is Point B.
($x_{Maximum}$, $y_{Maximum}$) which is Point C.
($x_{Maximum}$, $y_{Minimum}$) which is Point C.

We also label the perpendicular line ("PL1").

FIG. 19 shows an enclosing rectangle according to an embodiment. These four points describe the four lines which we label as:

Top Line (TL)
Bottom Line (BL)
Left Line (LL)
Right Line (RL)

Figure 20:
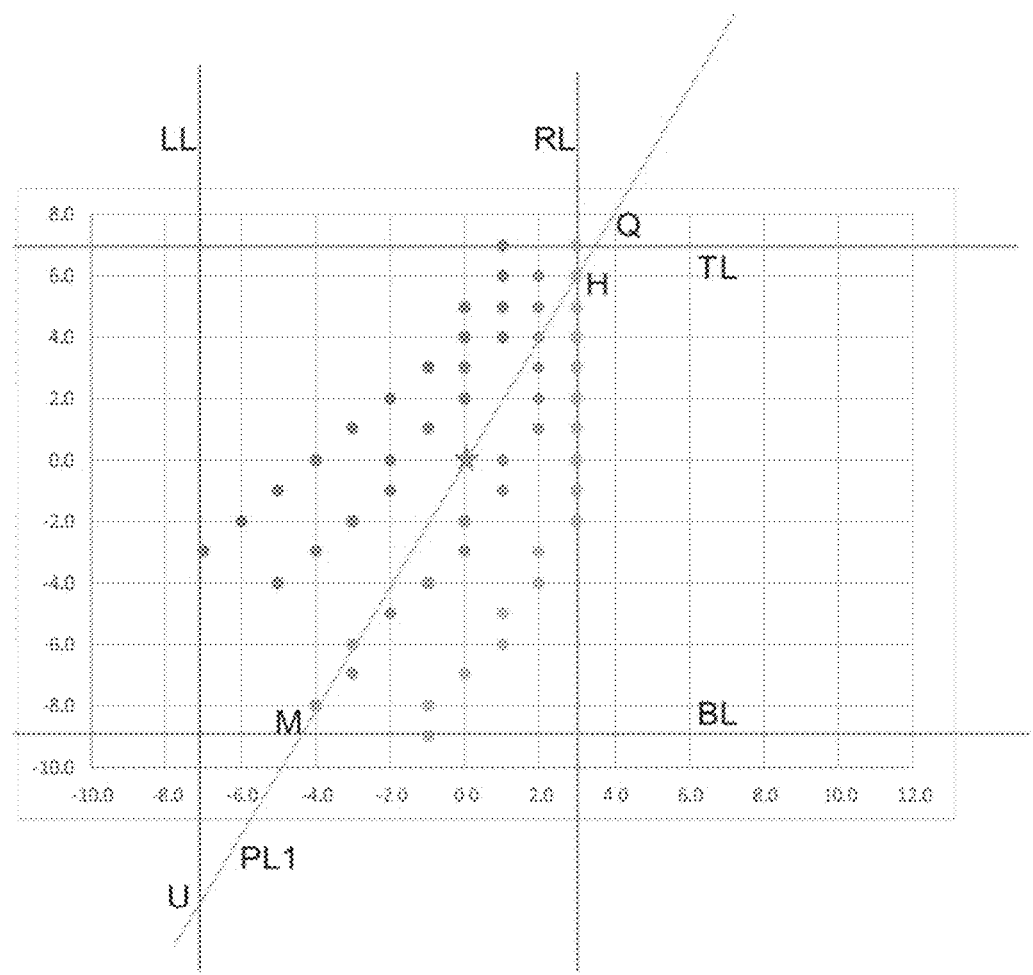
FIG. 20 shows the intersection of PL1 with TL at point Q, BL at point M, LL at point U, and RL at point H.
Figure 21:
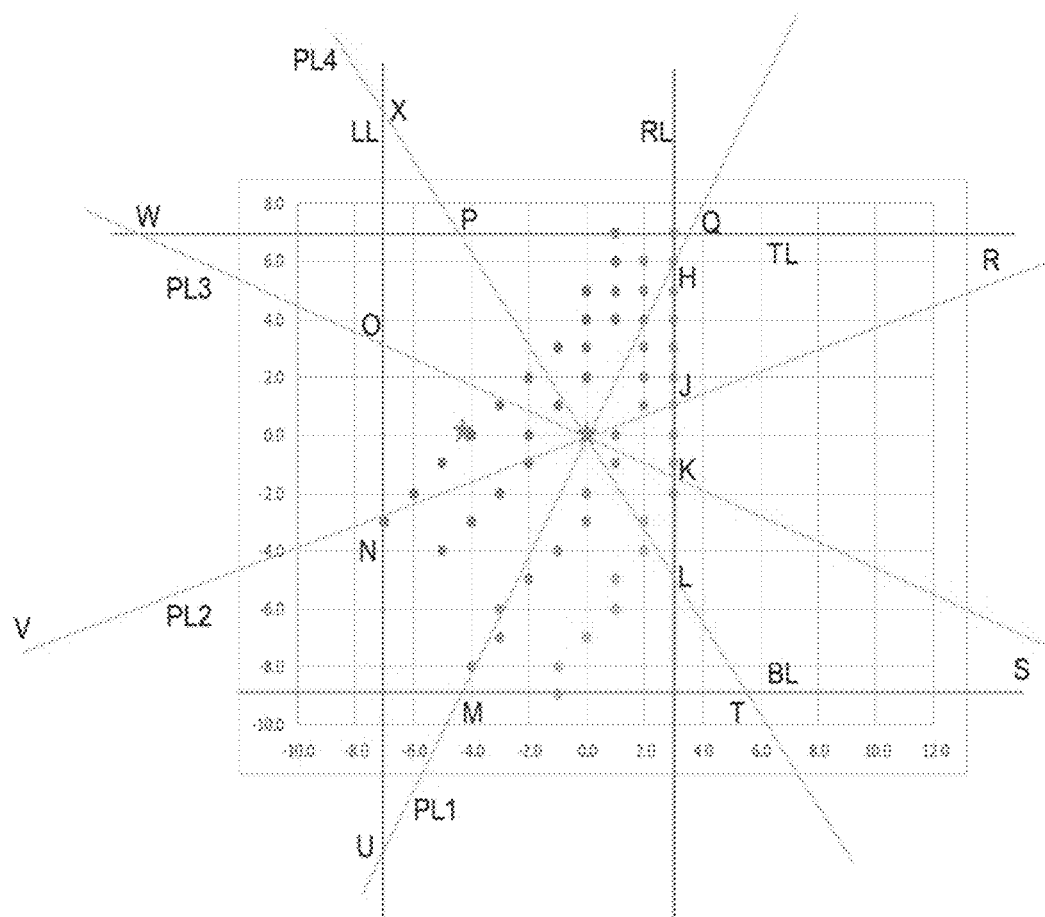
FIG. 21 shows the positioning relationships between the perpendicular lines PL1, PL2, PL3, and PL4 and the intersection points H, J, K, L, M, N, O, P, Q, R, S, T, U, V, W, and X between the perpendicular lines and the lines TL, BL, LL, and RL.

FIG. 20 shows the intersection of PL1 with TL at point Q, BL at point M, LL at point U, and RL at point H. FIG. 20 shows intersection points Q, H, M, and U. Any perpendicular line such as PL1 which is not parallel to one of the enclosing lines TL, BL, LL, or RL will intersect each of the four enclosing lines. These intersection points are labeled Q, H, M, and U in FIG. 20. Other possible orientations for the perpendicular line are shown in FIG. 21. Each perpendicular line orientation causes a different positioning and spacing of the K line centroids across the set of points.

FIG. 21 shows the positioning relationships between the perpendicular lines PL1, PL2, PL3, and PL4 and the intersection points H, J, K, L, M, N, O, P, Q, R, S, T, U, V, W, and X between the perpendicular lines and the lines TL, BL, LL, and RL. An infinite number of other perpendicular lines are possible. The rest of this embodiment examines the impact and importance of intersection points shown in FIG. 21.

At 1610, first calculate the distance between the pivot point, shown as a blue star, and each of the points Q, H, M, and U. Given a pair of line equations: $y=ax+c$ and $y=bx+d$, with $a \neq b$, $a \neq 0$, $b \neq 0$, $a \neq \infty$, and $b \neq \infty$, the two lines intersect at the point where the y coordinate and x coordinate are the same. First, compute the x coordinate for the intersection point by setting the y values the same:

$$ax+c=bx+d$$

We can rearrange the expression as $$ax-bx=d-c$$

and solve for x $$x = \frac{d-c}{a-b}$$

Then solve for v by inserting the x value into either of the two original equations. If we choose the first equation, the result is:

$$y = a\frac{d-c}{a-b} + c$$

Because the slope for the four lines which form the enclosing rectangle are 0 for TL and BL and ∞ for LL and RL, the general calculation does not apply. We use the formula for perpendicular line PL1 along with our knowledge of the positions of the four lines TL, BL, LL, and RL, and calculate the x and y coordinates for the intersection points. Transforming the original formula $$y=ax+c$$

by solving for x we get:

$$x = \frac{y-c}{a}$$

We then calculate the four intersection points as:

$Q$: ($x_{maximum}$, $a\,x_{maximum} + c$)

$H$: $\left(\frac{y_{maximum}-c}{a}, y_{maximum}\right)$ $M$: $\left(\frac{y_{minimum}-c}{a}, y_{minimum}\right)$ $U$: ($x_{minimum}$, $a\,x_{minimum} + c$)

In this example, the perpendicular line has the equation $y=2x+0$ and we use these values:

$x_{Minimum}=-7.0$
$x_{Maximum}=3.0$
$y_{Minimum}=-9.0$
$y_{Maximum}=9.0$

The intersect points are:
Q: (3.5, 7.0)
H: (3.0, 6.0)
M: (-4.0, -8.0)
U: (-7.0, -14.0)

Next, calculate the distance between the pivot point, (0,0) in the normalized data set, and each of the intersect points using the standard distance formula:

$$d=\sqrt{(x_1-x_2)^2+(y_1-y_2)^2}$$

Distance between the pivot point and Q=7.83
Distance between the pivot point and H=6.71
Distance between the pivot point and M=8.94
Distance between the pivot point and U=15.65

In this example, the shortest distance is between the pivot point and point H with a value of 6.71. Thus, choose H as the point from which to calculate the positions of the K parallel line centroids.

Figure 22:
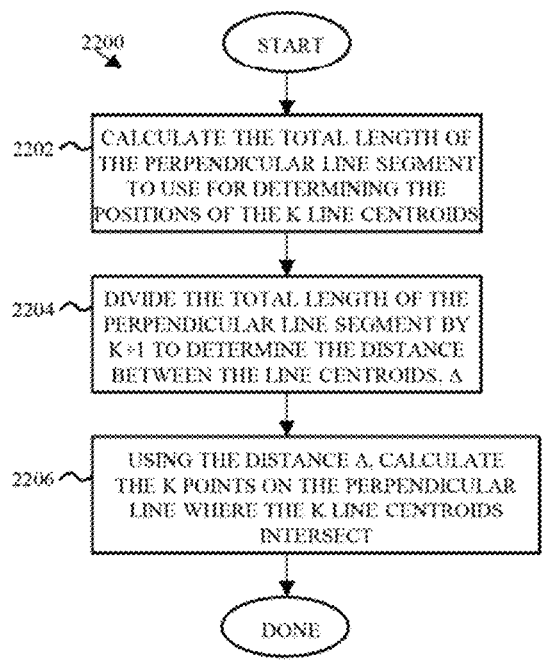
FIG. 22 shows the calculations of the positions on the perpendicular line according to one embodiment of the disclosure.

At 1612, calculate the positions, on the perpendicular line, for the K line centroids using process 600. The detail for the processing is shown in FIG. 22.

Figure 23:
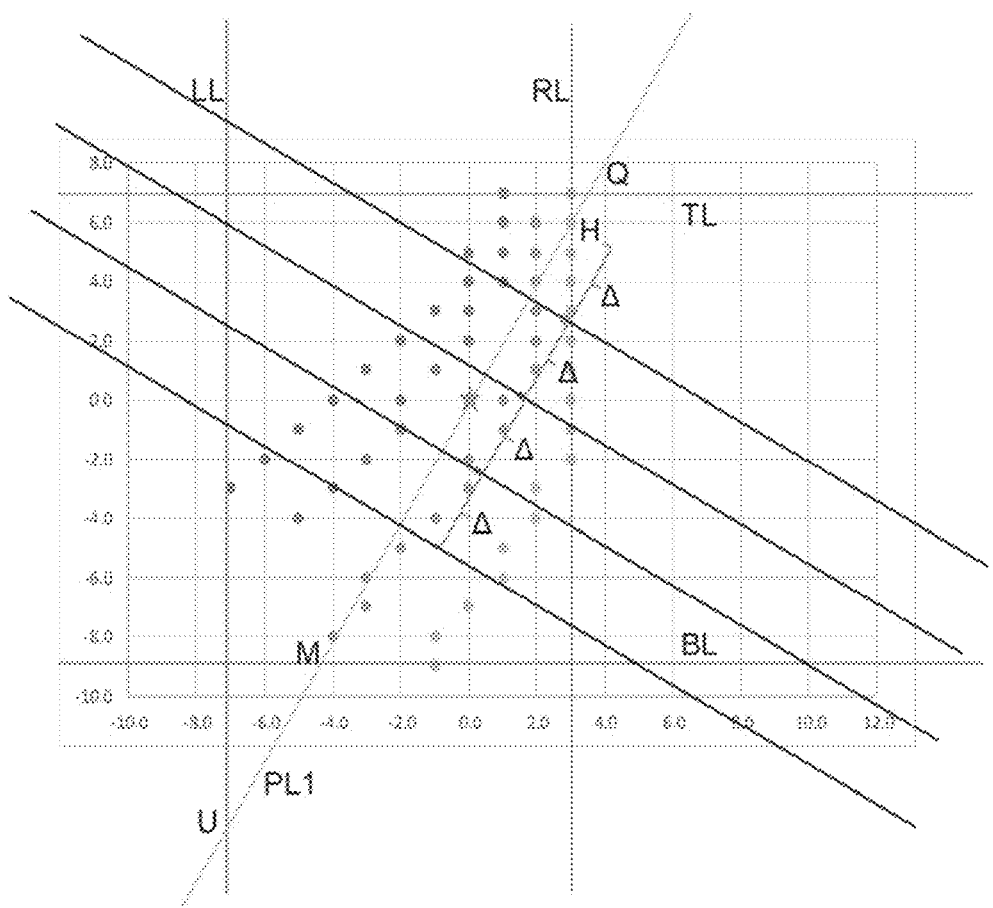
FIG. 23 shows an overview for step 2202 through step 2206 and step 1612 through step 1614.

FIG. 23 shows an overview for step 2202 through step 2206 and step 1612 through step 1614. One embodiment for the calculation for delta Δ uses the arithmetic average pivot point in the calculation, indicated by a star in FIG. 23.

At 2202, the distance between the pivot point and the intersection point H is 6.71, which is the shortest distance between the pivot point and any intersection point. In one embodiment, use the distance between the pivot point and H as one-half the length of the line segment within which to calculate the positions of the K line centroids. The total length is 2*6.71=13.42. Because the pivot point is a arithmetic average value, the 13.42 length used is less than the total distance between point H and point M, which is 16.77.

At 2204, suppose the number of clusters to discover, as given by the user, was 4, thus K=4. Dividing the total length, 13.42 by 5 (K+1) gives a delta value d of 2.68.

In another embodiment, calculate the length of the line segment as the distance between point H and point M, which is 16.77, At 502 and at 504 calculate the delta value d as 16.77 divided by K+1=5 giving a delta valued of 3.35.

For this example, we use the first embodiment and its d value of 2.68.

At 2206, calculate the K points on the line PL1 that are a distance d from the point H using the standard formula. Given the PL1 line formula y=ax+c the formula for calculating the two x values at a distance d from point $(x_0, y_0)$ is:

$$x = x_0 \pm \sqrt{\frac{d^2}{1+a^2}}$$

Then substitute the x value into the PL1 equation to get the corresponding y value.

For each point $x_0$ the invention chooses to add or subtract the Δ distance to derive the intersection point on the perpendicular line PL1 where each K line centroid intersects.

Figure 24:
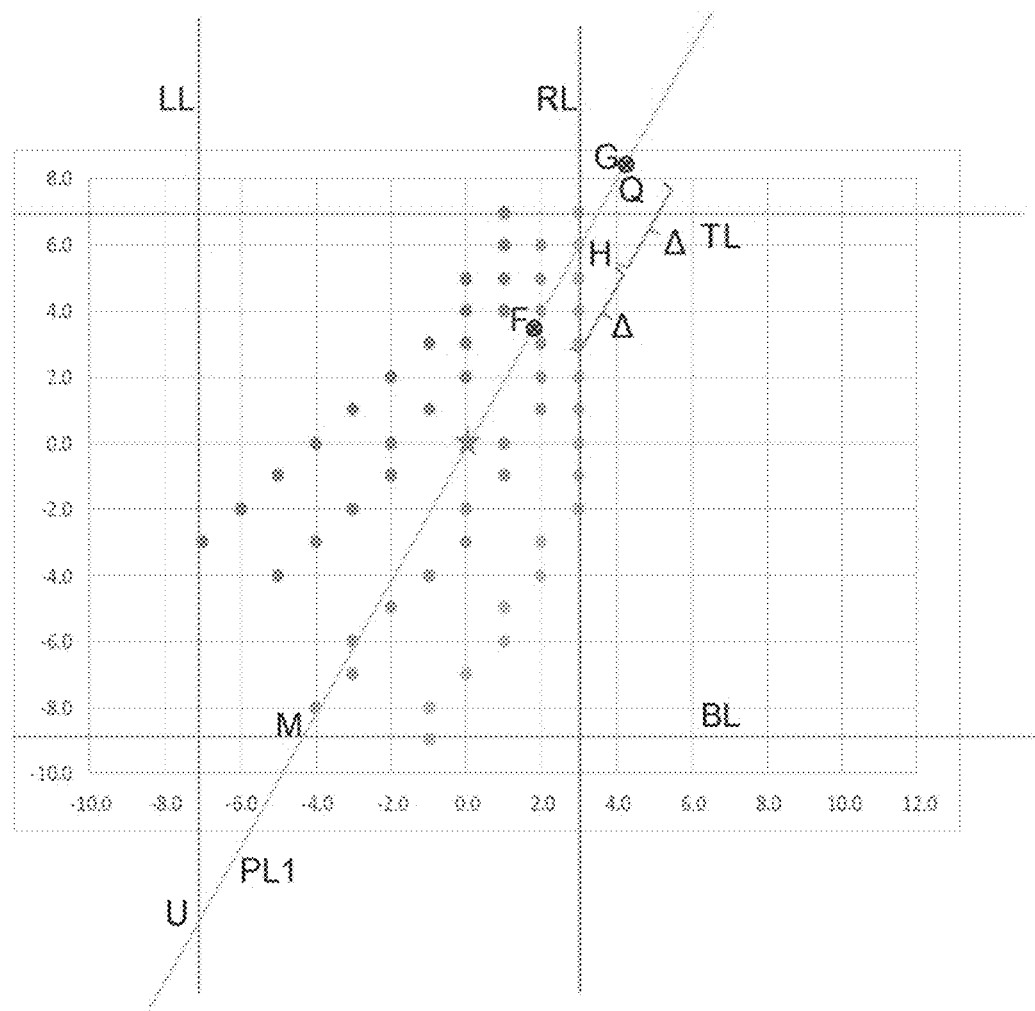
FIG. 24 shows the two points indicated by crosshatched circles labeled F and G which are at a Δ distance 2.68 from the intersection point H.

FIG. 24 shows the two points indicated by crosshatched circles labeled F and G which are at a Δ distance 2.68 from the intersection point H. To calculate the x value for point G:

$$x^+ = 3.0 + \sqrt{\frac{2.68^2}{1+2^2}} = 3.0 + \sqrt{\frac{7.18}{5}} = 3.0 + 1.19 = 4.19$$

Using the formula for the perpendicular line PL1:

$$y^+ = 2x + c$$

where c=0 because the line PL1 goes through the origin $$y^+ = 2*4.19 = 8.39$$

Thus, the coordinates for point G rounded to one decimal point are (4.2,8.4)

Calculate the coordinates for point F:

$$x^- = 3.0 - \sqrt{\frac{2.68^2}{1+2^2}} = 3.0 - \sqrt{\frac{7.18}{5}} = 3.0 - 1.19 = 1.81$$

Using the formula for PL1:

$$y^- = 2x + c$$

where c=0 because the line PL1 goes through the origin $$y^- = 2*1.8 = 3.62$$

Thus, the coordinates for point F rounded to one decimal point are (1.8,3.6)

The invention determines which point to use, in this example, point F or point G, based on intersect line and the slope of the perpendicular line (PL1) as shown in Table 2 in FIG. 49.

For example, referring to FIG. 21, the shortest intersect distance for line PL2 is to point J on RL. PL2 has a positive slope, so from Table 2 in FIG. 49, both the x increment and y increment use −d. For line PL3, the shortest intersect distance is point K on RL. PL3 has a negative slope, so from Table 2 in FIG. 49, the x increment uses +d and the y increment uses −d.

At 2206, using the example with PL1 having a slope of 2, the closest intersect point of H, total distance (2*(pivot point−H)) of 13.42, and a delta value of 2.68, the resulting intersection points on PL1 are:

(1.8, 3.6)
(0.6, 1.2)
(−0.6, −1.2)
(−1.8,−3.6)

At 1614, using the original slope for the K line centroids of −0.5 and the set of intersection points on line PL1, calculate the equations for the K line centroids using the standard formula for a line, given a slope and a point:

$$y - y_1 = m(x - x_1)$$

$y - 3.6 = -0.5(x - 1.8)$ gives the equation: $y = -0.5x + 4.5$ $y - 1.2 = -0.5(x - 0.6)$ gives the equation: $y = -0.5x + 1.5$ $y - (-1.2) = -0.5(x - (-0.6))$ gives the equation:
$y = -0.5x - 1.5$ $y - (-3.6) = -0.5(x - (-1.8))$ gives the equation:
$y = -0.5x - 4.5$ Thus, for this set of sample points, the K=4 starting line centroids are:

$y = -0.5x + 4.5$ $y = -0.5x + 1.5$ $y = -0.5x - 1.5$ $y = -0.5x - 4.5$

This embodiment uses infinitely long lines to represent the line centroids. In second embodiment, each line centroid can be a line segment in some position in the data space and having an arbitrary length.

An embodiment above describes an embodiment of the present invention which addresses the second problem by rotating the line centroids some number of times. At each rotation, the clustering mechanism assigns each point to its nearest line centroid for in the set of K clusters.

In another embodiment, the line centroids do not rotate, instead the field of points rotate. This embodiment avoids special handling required when the slope of the line centroids is 0 degrees or 90 degrees. At 0, y has the value 0 for every value of x. At 90 degrees, the slope is ∞.

Figure 25:
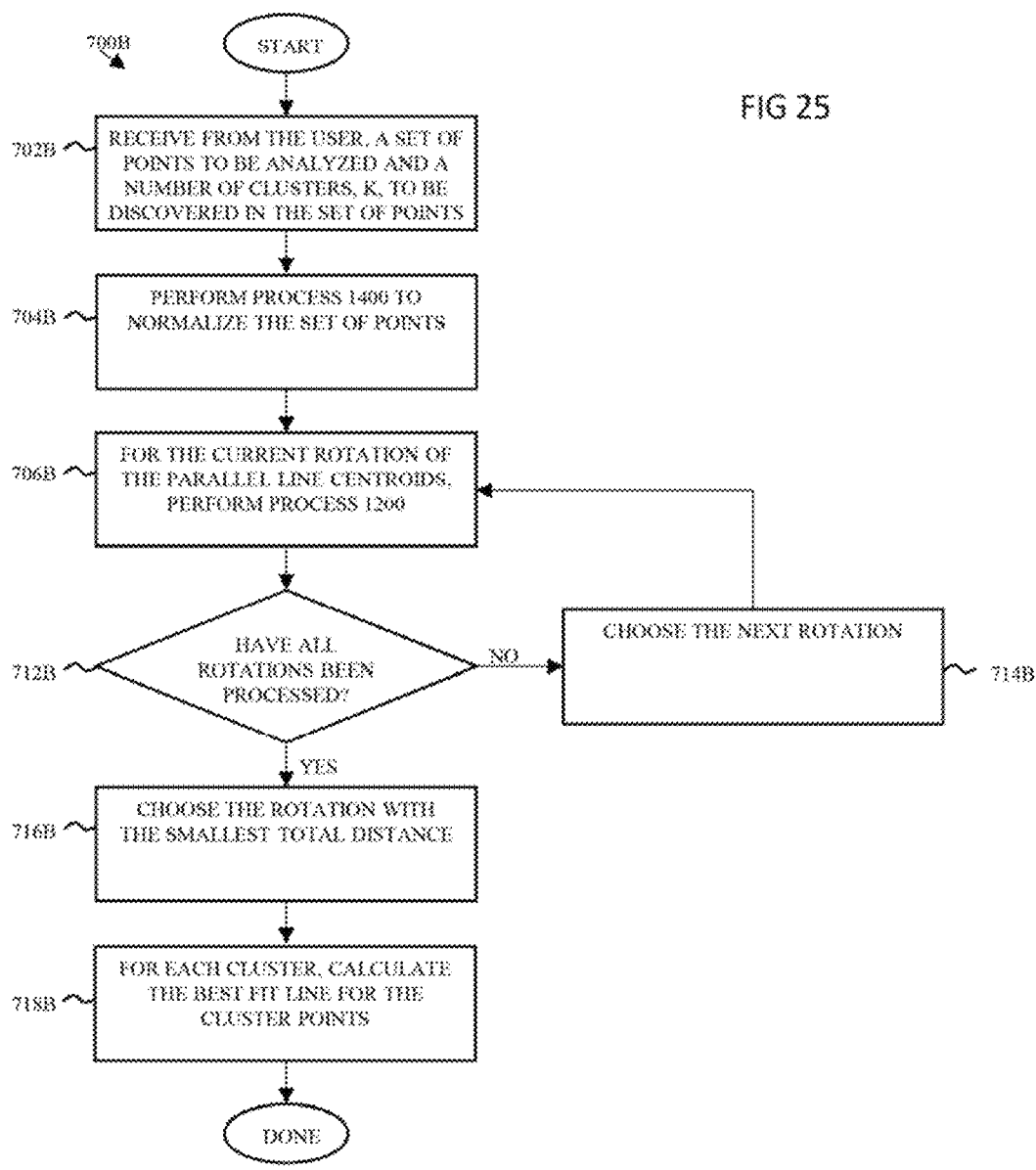
FIG. 25 shows a method 700 for finding data orientation using line centroids according to one embodiment.

FIG. 25 shows a method 700B for finding data orientation using line centroids according to one embodiment. FIG. 25 extends the processing described in FIG. 11 to include the step 704B to normalize the points.

At 702, receive the set of points and number of clusters K to discover in the data set. In one embodiment, input from the caller includes the starting value for theta, the theta increment, and the number of theta values to examine.

Step 704B uses process 1400 to normalize the points and move the center point of the space to the origin for best use of the standard rotation formula.

By normalizing the values of the set of points at 704B in FIG. 25 such that the pivot point is at the origin, the embodiment can use the standard rotation formula. The argument theta (θ) is the number of degrees to rotate.

$$x' = x \cos\theta + y \sin\theta$$

$$y' = -x \sin\theta + y \cos\theta$$

Figure 26:
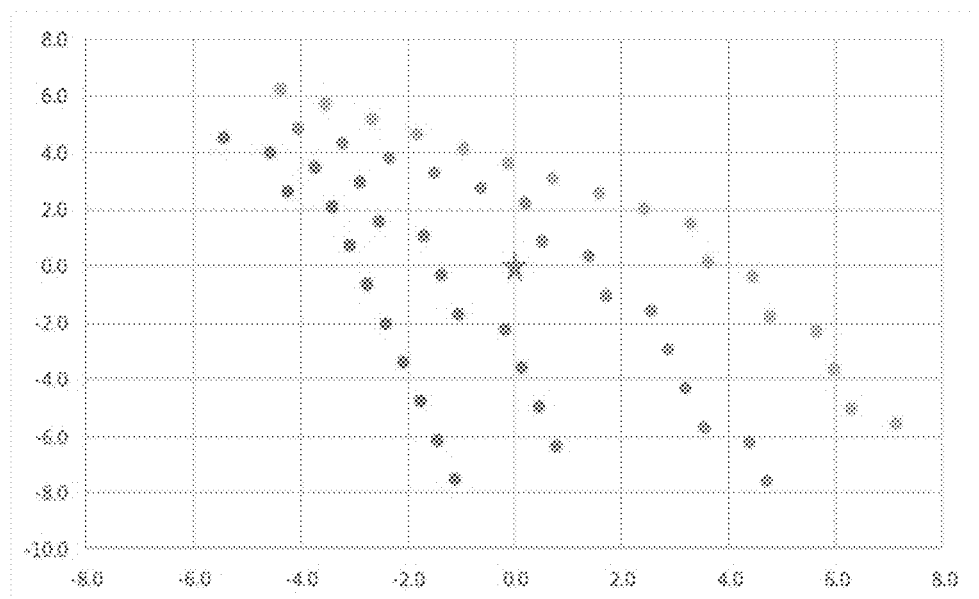
FIG. 26 shows the rotation of the sample point for θ=−45.
Figure 27:
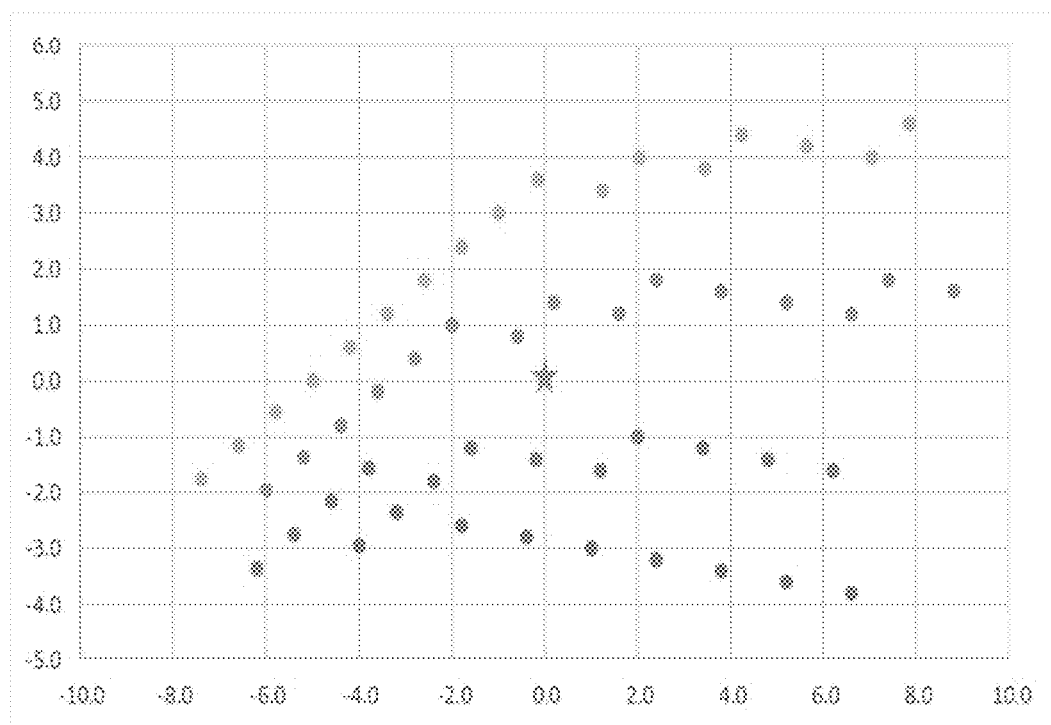
FIG. 27 shows the rotation of the sample point for θ=−135.
Figure 28:
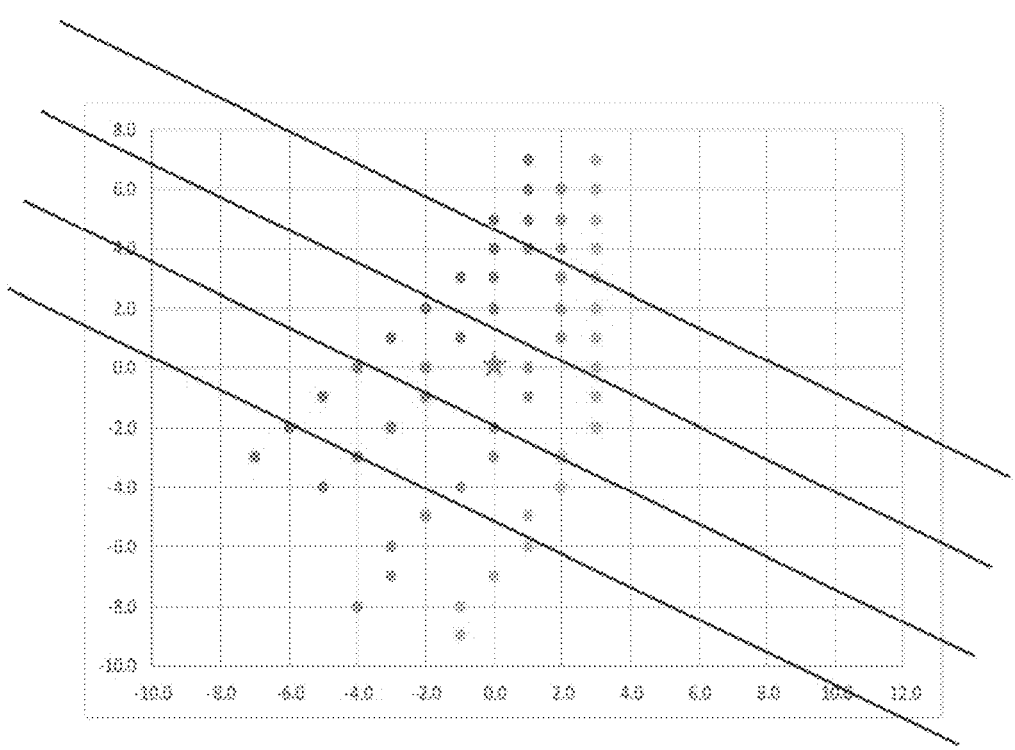
FIG. 28 shows the rotation of the sample point for θ=0.
Figure 29:
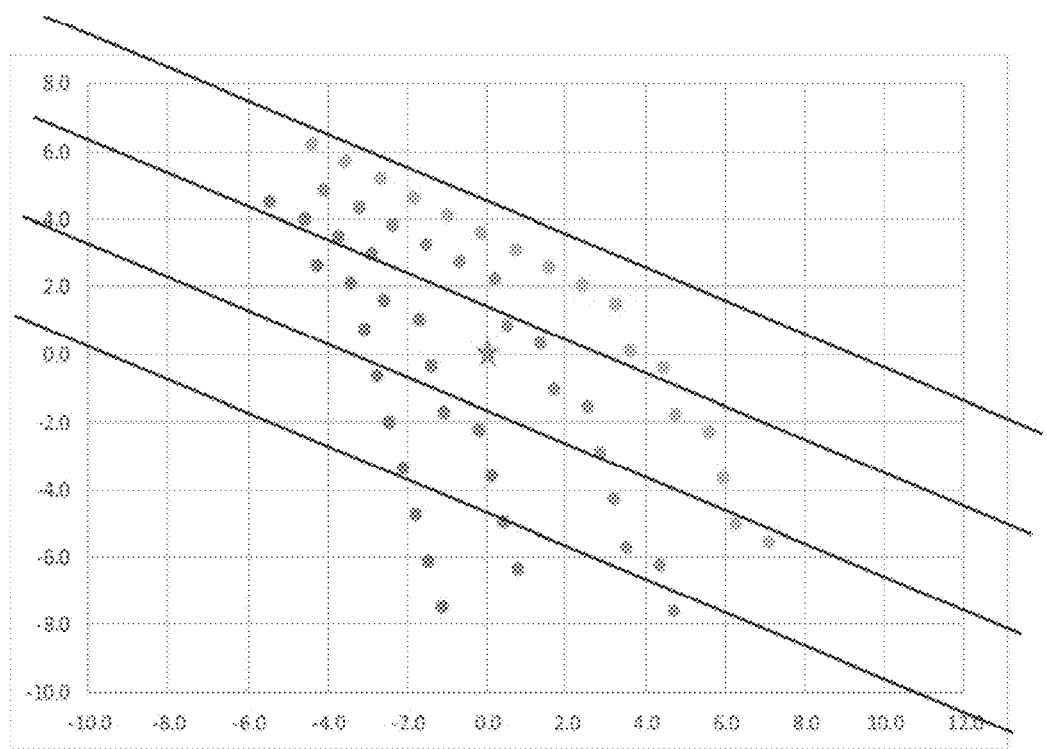
FIG. 29 shows the rotation of the sample point for θ=−45.
Figure 30:
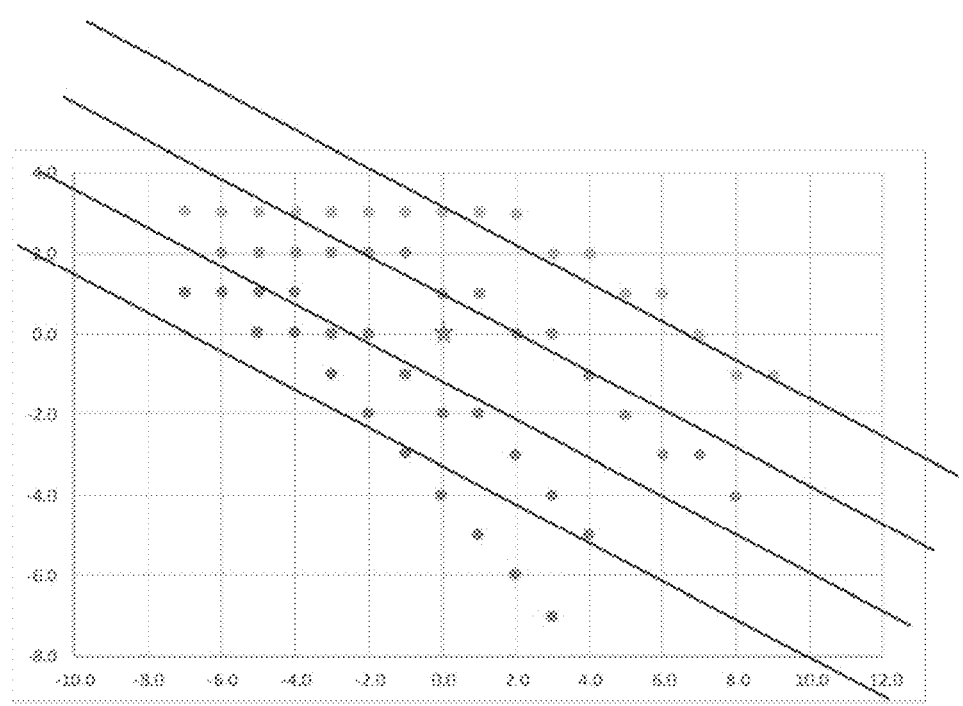
FIG. 30 shows the rotation of the sample point for θ=−90.
Figure 31:
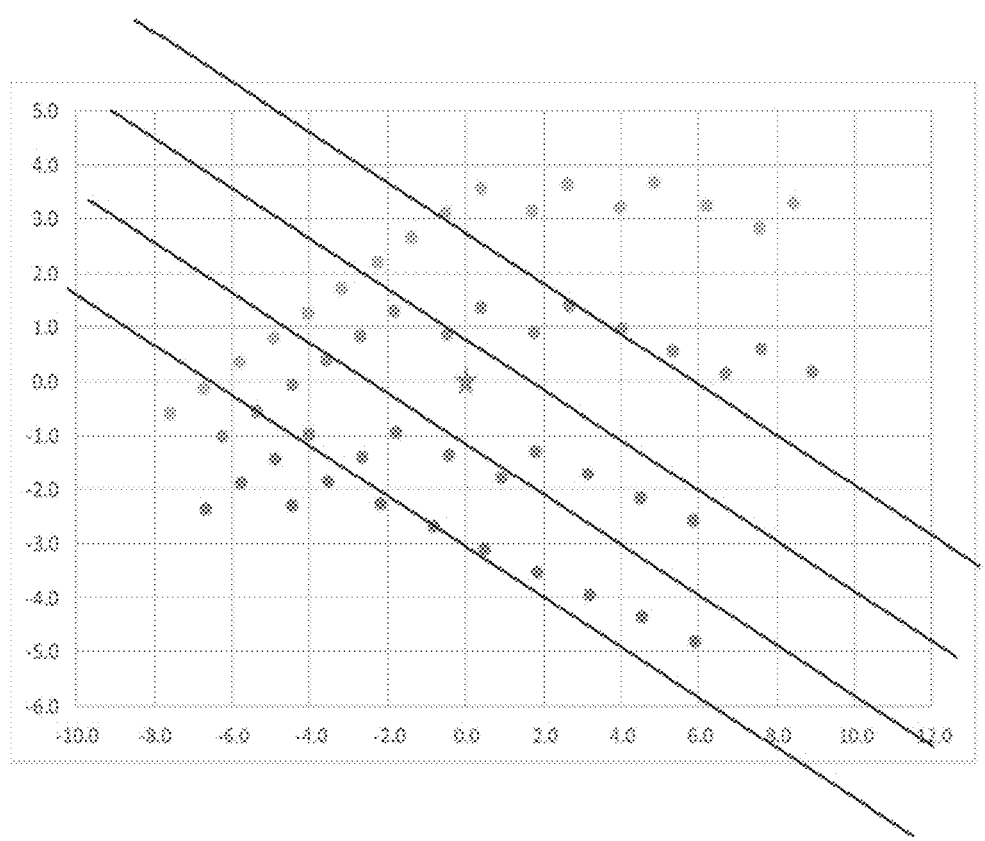
FIG. 31 shows the rotation of the sample point for θ=−135.
Figure 32:
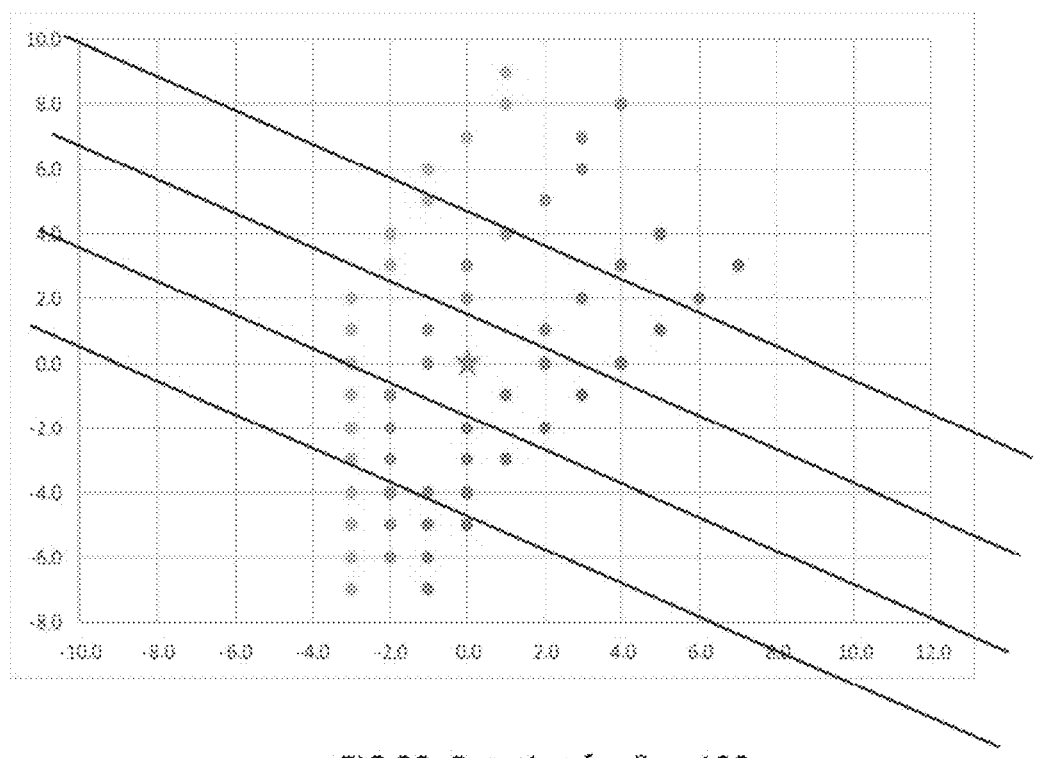
FIG. 32 shows the rotation of the sample point for θ=−180.

The standard formula rotates the grid counterclockwise and thus rotates the points clockwise when θ is positive. The rotation is counterclockwise when θ is negative. To illustrate the rotation processing, FIG. 26 and FIG. 27 show two rotations of the sample points for θ=−45 and θ=−135.

Using the sample data points and K=4 line centroids with slope −0.5, FIG. 28 through FIG. 32 show the rotation of the data points for θ=0, θ=−45, θ=−90, θ=−135, and θ=−180. Note that each rotation is around the pivot point at the origin, indicated by the blue star.

Step 706B through step 718B refine the processing of FIG. 11 step 1106 through step 1118. A key difference for this embodiment is that in step 714B, move to the next rotation by moving the set of points, not moving the set of line centroids.

At step 706B use process 1200 to cluster the points around the line centroids. In process 1200 at step 1204, use process 1600 in FIG. 16 to generate the set of line centroids.

In one embodiment, the best fit line centroid (best fit curve) is calculated at step 718 only for the rotation with the smallest total distance. In a second embodiment, the best fit line centroid is calculated for each rotation. The second embodiment reduces the total distance overall for each rotation. Each embodiment can cause a different rotation to be identified as having the smallest total distance. The disadvantage of the second embodiment is that in creating a best fit line centroid for each cluster, the set of line centroids might no longer be parallel. If the line centroids are not parallel, then the line centroids cross at some point. It is previously asserted that a fundamental attribute of clustering is that clusters do not overlap. When the line centroids cross, the resulting clusters might overlap, dependent on the data values being clustered. Then Fuzzy clustering techniques must be applied in step 306 through step 1214. Using Fuzzy clustering as an alternative to K-Means clustering is yet another embodiment of the invention.

Returning to process 1200 in FIG. 12 and looking at each step in detail.

At step 1202, use an indicia to designate that each point is not assigned to a cluster. One embodiment initializes each point to be a member of cluster 0. A second embodiment initializes each point to be a member of cluster −1 or other illegal cluster identifier. A third embodiment sets a flag to indicate each point is unassigned.

At step 1204, choose the initial set of K cluster line centroids using process 1600. Previous embodiment explains this process in detail. In one embodiment, the slope is input by the user. A second embodiment uses a default value such as −0.5 for the slope. Any slope which is not 0 and not 90 can be used with no effect on the outcome of the cluster processing.

Step 1206 uses the standard distance formula for calculating the distance between a point and a line. Given a line formula $ax+by+c=0$ and a point $(x_0, y_0)$ the distance can be calculated using the standard distance formula:

$$d = \frac{|ax_0 + by_0 + c|}{\sqrt{a^2 + b^2}}$$

The formula does not apply directly to horizontal lines where the slope or coefficient a=0 or vertical lines where slope or coefficient a=∞. For the case of a horizontal line where a=0 and b≠0, the distance is calculated along a vertical line segment using the formula:

$$\frac{|by_0 + c|}{|b|}$$

For the case of a vertical line, where b=0, the distance is calculated along a horizontal line segment using the formula:

$$\frac{|ax_0 + c|}{|a|}$$

By rotating the set of points rather than rotating the line centroids as previously described, the present invention avoids these two special cases.

Steps 1208, 1210, and 1212 follow the standard K-Means clustering algorithm.

At step 1212, one embodiment uses cluster association change as a termination criteria for the loop created by step 1206 through step 1214. A second embodiment uses cluster association along with an iteration count as a termination criteria. After the loop has been traversed (iterated) some predefined number of times, the processing continues with step 1216.

Step 1214 calculates a new set of K parallel line centroids. The embodiment uses an arithmetic average approach to find the pivot point for the set of data points, as well as explaining alternate embodiments. Step 1214 applies the same embodiment using an arithmetic average approach and applies it to the points associated with each cluster. For example, for cluster 1 (c1) having a count of members indicated by $n_{c1}$, and cluster members points $(x_{c1-1}, y_{c1-1}) \ldots (x_{c1-n}, y_{c1-n})$ the calculation would be:

$$x_{new} = (x_{c1-1} + x_{c1-2} + \ldots + x_{c1-n})/n_{c1}$$

and $$y_{new} = (y_{c1-1} + y_{c1-2} + \ldots + y_{c1-n})/n_{c1}.$$

Next, calculate the equations for the new K line centroids using the standard formula for a line, given a slope and a point:

$$y - y_{new} = m(x - x_{new})$$

$y - 2.0 = -0.5(x - 1.0)$ gives the equation: $y = -0.5x + 2.5$ $y - 0.2 = -0.5(x - 0.5)$ gives the equation: $y = -0.5x + 0.45$ $y - (-1.1) = -0.5(x - (-1.5))$ gives the equation:
$y = -0.5x - 1.85$ $y - (-3.6) = -0.5(x - (-1.8))$ gives the equation:
$y = -0.5x - 4.5$ Thus, for this set of sample points, the K=4 new line centroids after the first iteration and first recalculation at step 1214 are:

$y = -0.5x + 2.5$ $y = -0.5x + 0.45$ $y = -0.5x - 1.85$ $y = -0.5x - 4.5$

Step 1216 calculates the total distance for each point to its cluster line centroid. Step 1216 is similar to the calculation at step 1206. Given a line centroid formula ax+by+c=0 and a point $(x_0,y_0)$ associated with tale line centroid's cluster, the distance can be calculated using the standard distance formula:

$$d = \frac{|ax_0 + by_0 + c|}{\sqrt{a^2 + b^2}}$$

Perform this calculation for each point in each cluster and sum the distances to get a total distance for this rotation.

Step 1206 calculates the distance between each line centroid and each point. Step 316 narrows the scope and calculates the distance between each line centroid and each point associated with the cluster defined by that centroid.

Note that with the embodiment described herein, the resulting line centroids do not reflect the original orientation of the data points. Nonetheless, the relationship between the line centroids for the clusters and their associated points is correct. A second embodiment re-rotates the points and line centroids to reflect the original positions of the points.

In a further embodiment, the idea of centroid can be extended to parabola. In the original problem space as shown in FIG. 5, the lanes of traffic are not straight lines, but curves. The invention extends to parabola centroid values by enhancing the techniques for solving the three analysis problems. This embodiment explains use of parabolas as centroids, that is parabolic curves with the following quadratic equation:

$y=ax^2+bx+c$

Figure 33:
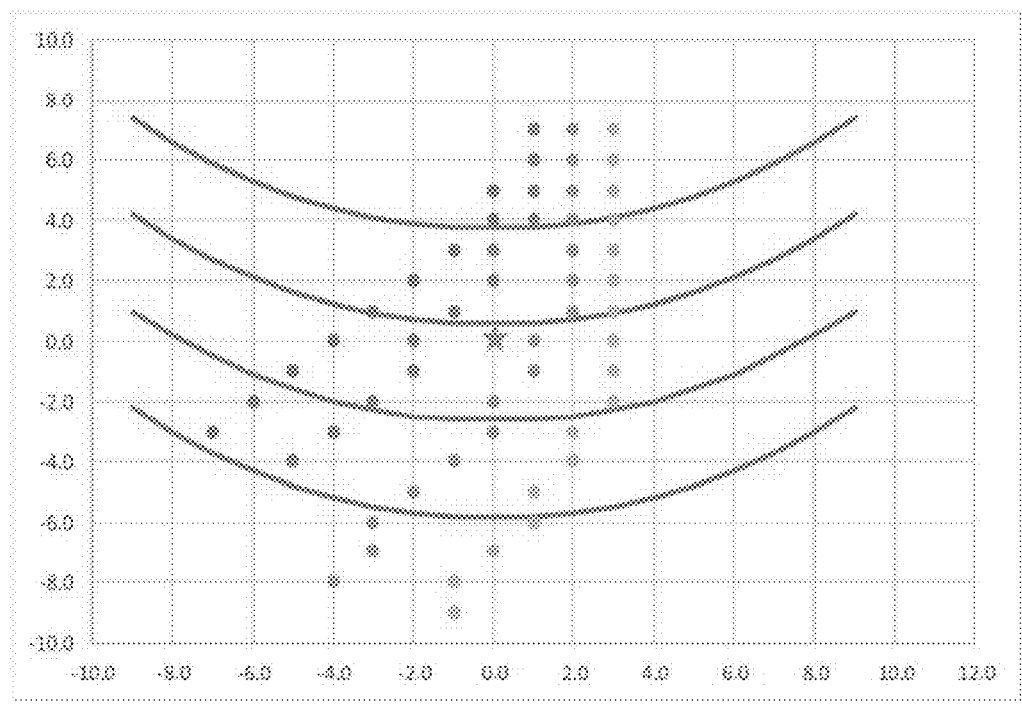
FIG. 33 shows the basic idea of using parabola centroids with the values: K=4, a=0.05, b=−0.05, c={+2, 0, −2, −4}, and θ=0.

FIG. 33 shows the basic idea of using parabola centroids with the values:

$K=4$ $a=0.05$ $b=-0.05$ $c=\{+2,0,-2,-4\}$ $\theta=0$

Figure 34:
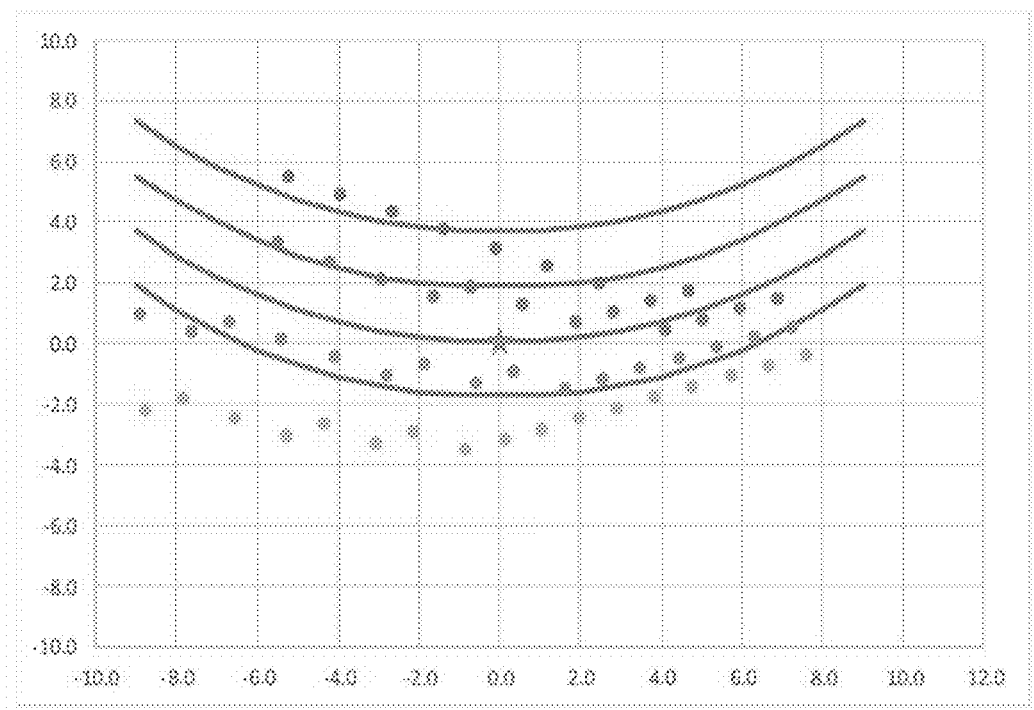
FIG. 34 shows after rotating the points to θ=60 the parabola centroids have a very close alignment with the actual shapes of the K=4 clusters.

After rotating the points to $\theta=60$ the parabola centroids have a very close alignment with the actual shapes of the K=4 clusters as shown in FIG. 34.

In one embodiment, first normalize the set of points according to the mechanism of process 1400 as shown in FIG. 14. This embodiment simplifies creating the parabolas and rotating the points around the parabolas. A second embodiment places the K parabola centroids at an arbitrary point in the space and uses alternate techniques for distance calculation and rotation of the points around an arbitrary point in the space.

Next, calculate the position and equations for the K parabola centroids. One embodiment simplifies the calculation by having the parabolas' axis of symmetry align with the Y axis and always have the value for the coefficient a be positive. When the coefficient a is positive, the parabolas face "upward."

Figure 35:
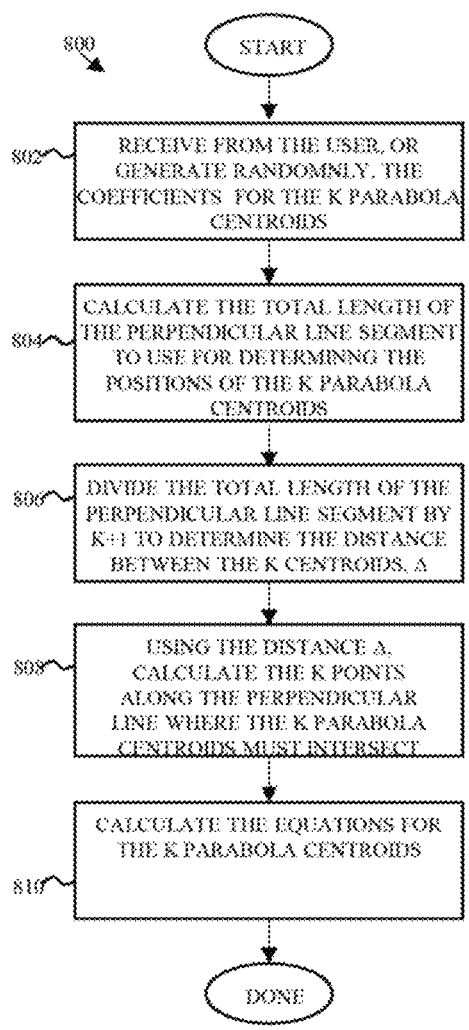
FIG. 35 shows a method 800 that refines the method 1600 and 2200 for the use with parabola centroids.

FIG. 35 shows a method 800 that refines the method 1600 and 2200 for the use with parabola centroids. Previously, receive the set of points to be clustered as well as the number of clusters, K, to discover in the set of points. The points may be normalize, or unnormalized. In this example, the points have been normalized following process 1400.

Figure 36:
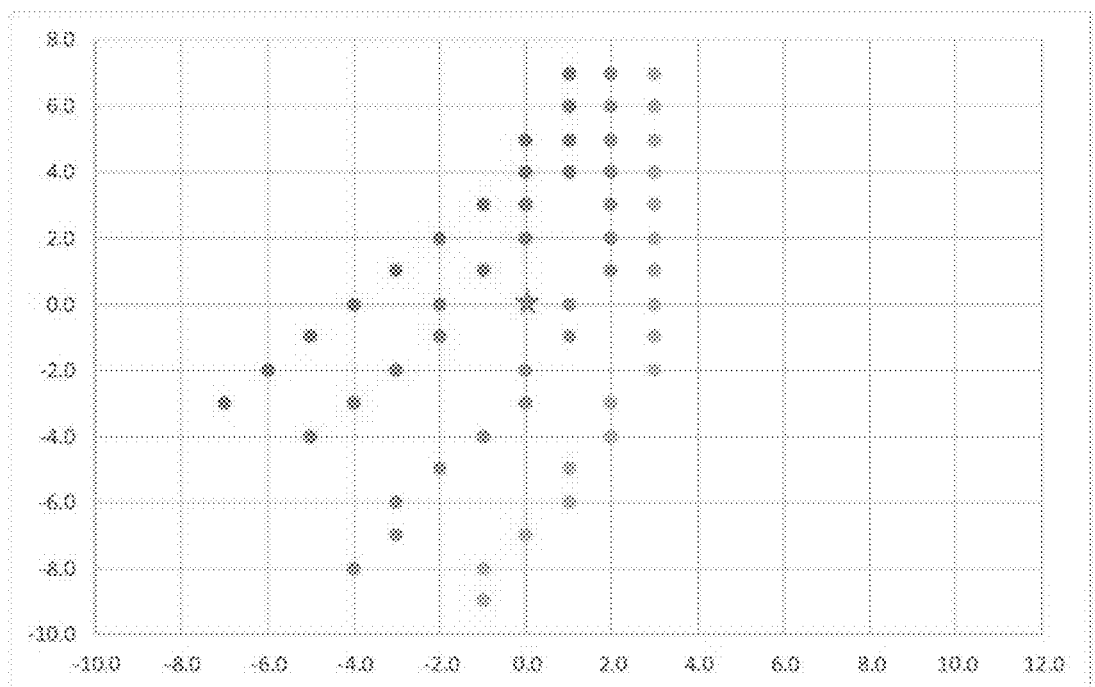
FIG. 36 shows the normalized sample set of points with the pivot point indicated by the star at the origin according to one embodiment of the disclosure.

FIG. 36 shows the normalized sample set of points with the pivot point indicated by the star at the origin. At 804 calculate the total length of the perpendicular line segment for the range of points. Because of the simplification to align the parabola centroids with the Y axis, the K=4 vertexes of the parabola centroids lie along the Y axis. The perpendicular line PL1 described in process 500 aligns with the Y axis. In this example, the total length of the perpendicular line segment is $Y_{maximum}-Y_{minimum}=7-(-9)=16$.

At 806, suppose the number of clusters to discover, as given by the user, was 4, thus K=4. In one embodiment, divide the total length, 16 by 5 (K+1) giving a delta value d of 3.2.

At 808, add the delta value 3.2 to $Y_{minimum}$ to calculate the vertexes of the K parabola centroids. Unlike the general solution for line centroids, this embodiment for parabola centroids does not have to take into account the orientation of the centroids. They always face "up".

In one embodiment, at 802, receive from the user the values for the coefficients a and b for the K parabola centroids to be generated. In a second embodiment, if no coefficients are given by the user, use default values. Following the second embodiment, and using the outcome from step 806, the K=4 parabola centroid vertex points for this example data set on PL1 from step 808 are:

(0,−5.8)

(0,−2.6)

(0,0.6)

(0,3.8)

Figure 37:
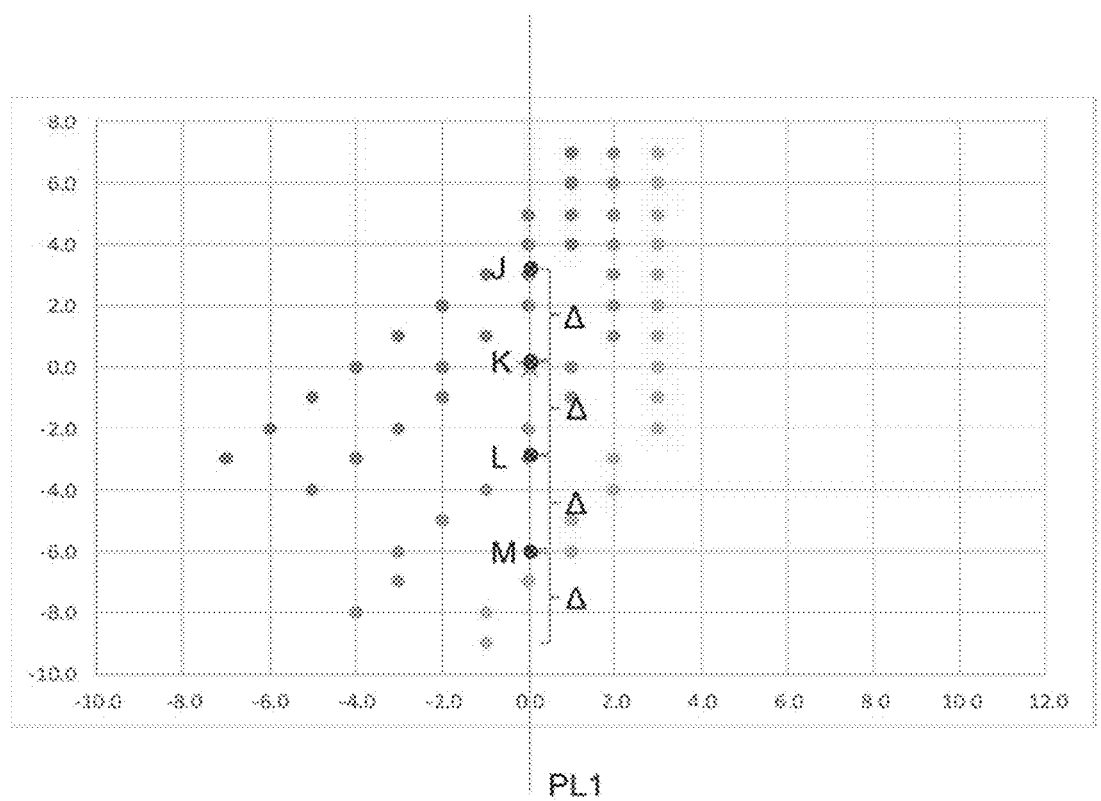
FIG. 37 illustrates points J, K, L, and M.

These are illustrated by the points J, K, L, and M in FIG. 37.

At 810, calculate the equations for the K parabola centroids using the standard quadratic equation for the parabola:

$y=ax^2+bx+c$ and use the coefficient values from the user:

$a=0.05$ $b=-0.05$

Thus, for this set of sample points, the K=4 starting parabola centroids are:

$y=0.05x^2-0.05x-5.8$ $y=0.05x^2-0.05x-2.6$ $y=0.05x^2-0.05x+0.6$ $y=0.05x^2-0.05x+3.8$

Figure 38:
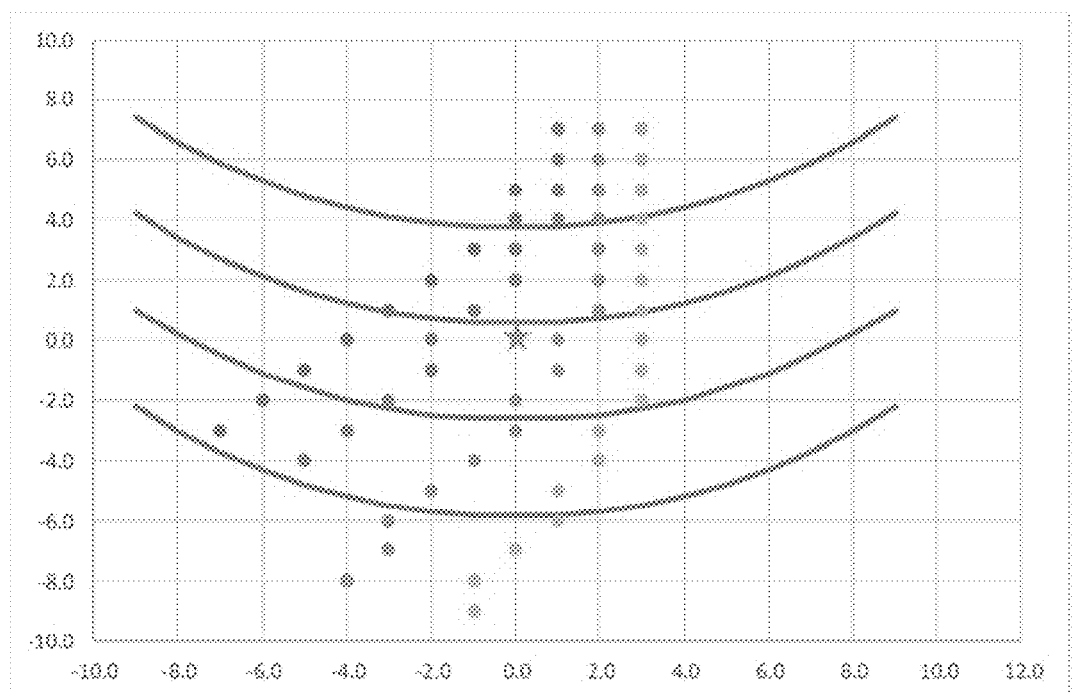
FIG. 38 shows starting parabola centroids according to one embodiment of the disclosure.

The starting parabola centroids are shown in FIG. 38.

Figure 39:
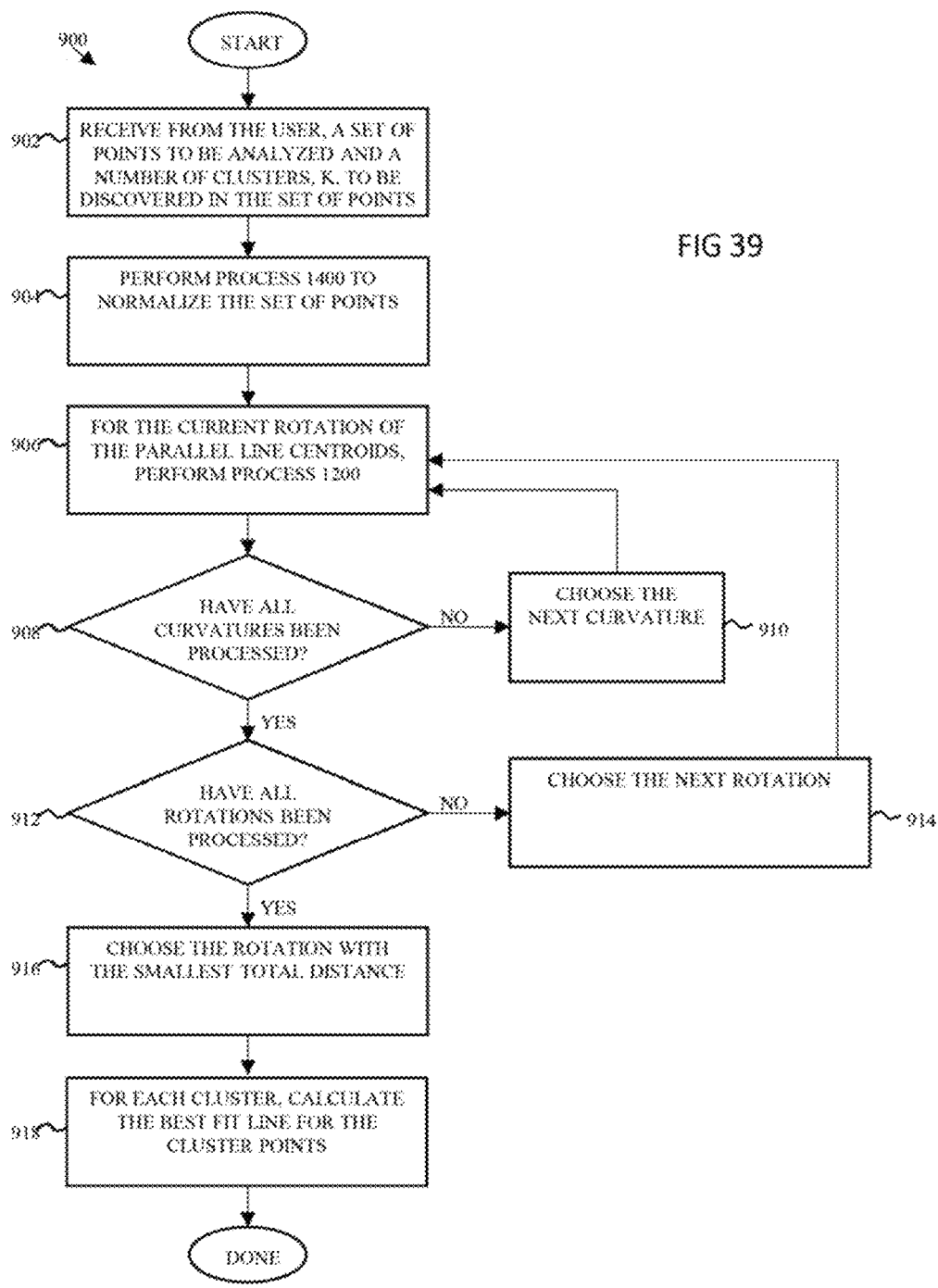
FIG. 39 shows an application of method 900 for finding data orientation using parabola centroids according to one embodiment.

FIG. 39 shows the overall method 900 for finding data orientation using parabola centroids according to one embodiment.

At 902, receive from the user the set of points and the number of clusters K to be discovered. In one embodiment receive from the user parameters to describe the shape of the parabola centroids including the values for the coefficients a and b in the parabolic equation.

Step 904 uses process 1400 to normalize the points and move the center point of the space to the origin for best use of the standard rotation formula as explained above.

At step 906 use process 1200 to cluster the points around the parabola centroids. At step 304, use process 800 to generate the set of parabola centroids.

Figure 40:
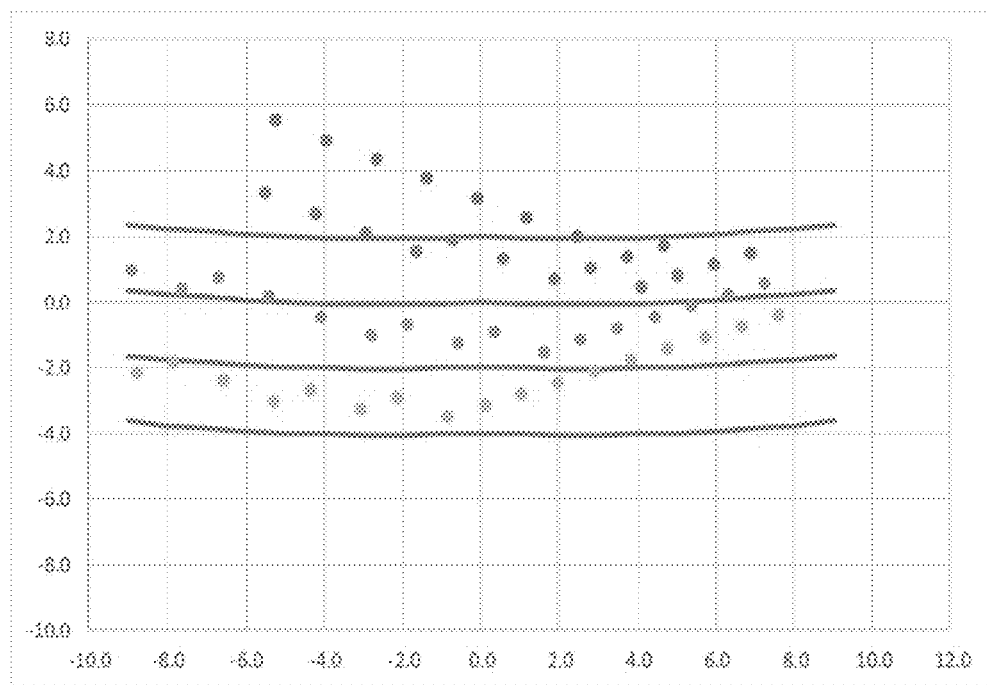
FIG. 40 shows the result with a=0.01.
Figure 41:
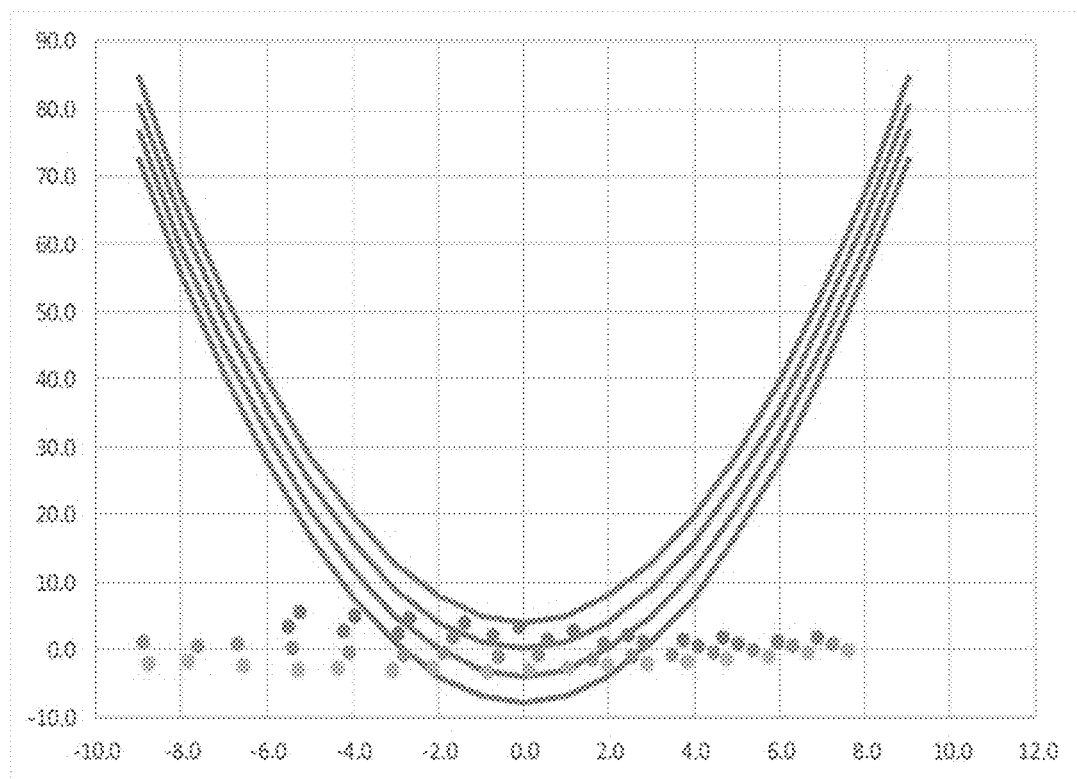
FIG. 41 shows the result with a=1.0.

The value of the coefficient a changes the curvature of the parabola. For example, FIG. 40 shows the result with a=0.01. FIG. 41 shows the result with a=1.0.

In one embodiment of the invention, use the cycle of steps 908, 910, 906 to perform the process 1200 clustering on multiple curvatures of the parabola centroids for each rotation of the set of points. In one embodiment, receive from the user a set of values for the coefficient a. In another embodiment, receive from the user an initial value for the coefficient a, an increment for a, and a number of increments to apply. Step 910 applies the embodiment's mechanism to create the next value for the coefficient a, that is, the next curvature to analyze.

Steps 912, 914, and 906 apply process 1200 clustering on multiple rotations of the set of points. As discussed previously, one embodiment of the invention rotates the points rather than the centroids. The same approach applies here to parabola centroids. In one embodiment, receive from the user a set of values for the rotations, that is, for the values for θ. In another embodiment, receive from the user an initial value for θ, an increment for θ, and a number of increments to apply. With line centroids, ideally explore θ values between and $θ_{initial}$ and $θ_{initial}$+179.99 (9 repeating). A θ increment of 180 results in the same line centroid values as Parabola centroids are directional, ideally explore θ values between $θ_{initial}$ and $θ_{initial}$+359.99 (9 repeating). A θ increment of 360 results in the same parabola centroid values as $θ_{initial}$.

At step 916, choose the parabola curvature and point rotation which creates the smallest total distance for the clusters.

In one embodiment, the best fit parabola centroid is calculated at step 918 only for the rotation with the smallest total distance. In a second embodiment, the best fit parabola centroid is calculated for each rotation, prior to step 1216. The second embodiment reduces the total distance overall for each rotation. Each embodiment can cause a different rotation to be identified as having the smallest total distance.

Returning to process 1200 in FIG. 12 and looking at each step in detail for using parabola centroids.

At step 1202, use an indicia to designate that each point is not assigned to a cluster. One embodiment initializes each point to be a member of cluster 0. A second embodiment initializes each point to be a member of cluster −1 or other illegal cluster identifier. A third embodiment sets a flag to indicate each point is unassigned.

At step 1204, choose the initial set of K cluster parbola centroids using process 900.

Step 1206 uses the standard distance formula for calculating the distance between a point and a parabola. Given a quadratic equation for the parabola $y=ax^2+bx+c$ and a point $(x_0,y_0)$ the distance can be calculated using the standard distance formula with the parabolic equation substituted for the value y:

$$d=(x-x_0)^2+\sqrt{(x^2+bx+c-y_0)^2}$$

Steps 1208, 1210, and 1212 follow the standard K-Means clustering algorithm.

As discussed, at step 1212, one embodiment uses cluster association change as a termination criteria for the loop created by step 1206 through step 1214. A second embodiment uses cluster association along with an iteration count as a termination criteria. After the loop has been traversed (iterated) some predefined number of times, the processing continues with step 1216.

Step 1214 calculates a new set of K parabola centroids. Step 1214 applies the same embodiment using an arithmetic average approach and applies it to the points associated with each cluster. This is explained in detail for line centroids embodiment.

Step 1216 calculates the total distance for each point to its cluster parabola centroid. Step 1216 is similar to the calculation at step 1206. Step 1206 calculates the distance between each parabola centroid and each point. Step 1216 narrows the scope and calculates the distance between each parabola centroid and each point associated with the cluster defined by that centroid.

In another embodiment, the centroids can be extended as polynomial centroids. The invention extends to arbitrary polynomial centroids by enhancing the techniques for solving the three analysis problems.

Figure 42:
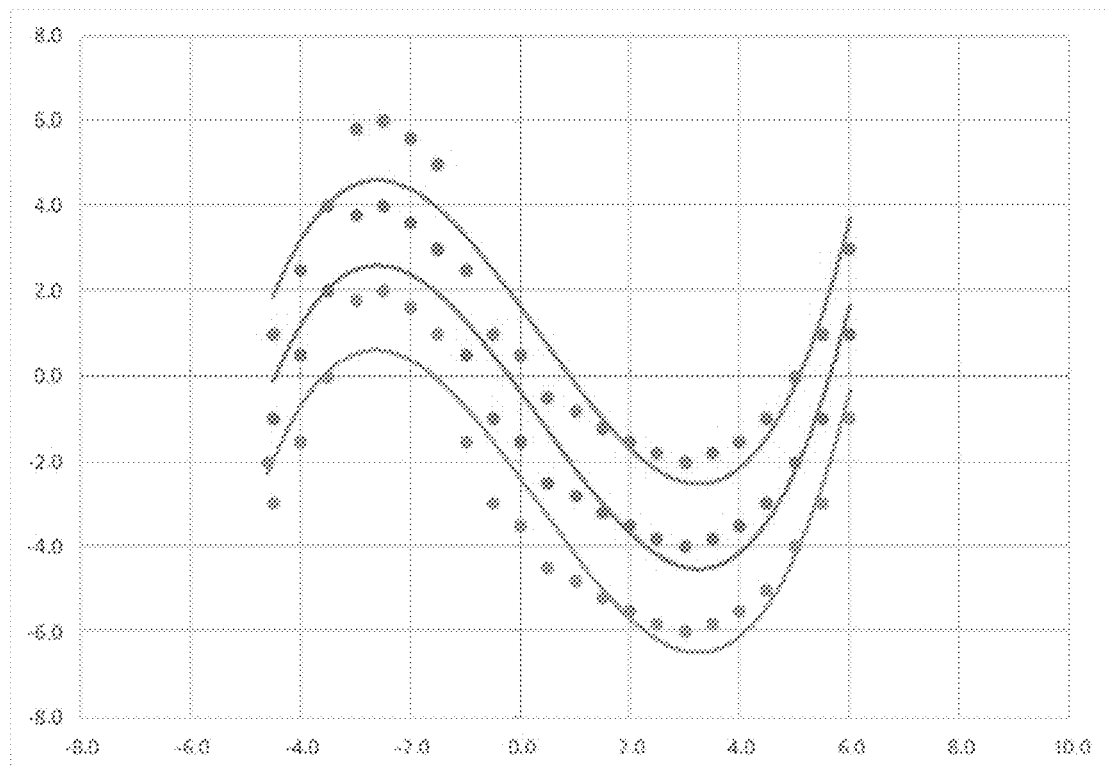
FIG. 42 shows the basic idea with polynomial centroid curves of degree 3, a sample set of points colored with an ideal clustering outcome, and K=3 polynomial centroids according to one embodiment of the disclosure.

FIG. 42 shows the basic idea with polynomial centroid curves of degree 3, a sample set of points colored with an ideal clustering outcome, and K=3 polynomial centroids. These polynomials follow the cubic function:

$$y=ax^3+bx^2+cx+d$$

In one embodiment, each value for x in the polynomial curve generates exactly one value for y. A second embodiment relaxes that restriction with the corresponding changes to distance calculations and centroid optimizations.

For the first problem, receive from the user set of points, the value K for the number of clusters to discover, the coefficient values a, b, c, d, . . . , and the polynomial degree to determine the overall shape of the curve. Extend the methodology of previous embodiment to create the initial set of K polynomial centroids of the degree given by the user.

For the second problem, receive from the user a value for theta, an increment for theta, and a number of theta values to analyze. Adapt the distance calculations in process 1200, steps 1206 and 1216 to calculate the distance between a point and a polynomial.

For the third problem, extend the distance measurement technique used in clustering between a point and a line centroid as discussed in previous embodiment, to the distance between a point and a polynomial centroid. Also, extend the centroid optimization phase of the clustering from line centroid optimization to polynomial centroid optimization.

The embodiment can be extended to three-dimensional or n-dimensional analysis by applying appropriate technique extensions for solving the three analysis problems. The embodiment of the invention extends readily to three dimensions and line centroids. Extending the invention from parabola centroids to three dimensional paraboloid centroids is also relatively straightforward. Extending the invention to multi-dimensional polynomial spaces requires complex thinking as well as complex mathematics.

It is also possible to map the 3D space onto 2D using orthographic or other projection techniques to apply (simpler) 2D mathematics.

For any nD space, the dimensionality of the centroids can be less than or equal to the dimensionality of the space itself. The simple case is the motivator for the invention itself, namely, increasing the dimensionality of the cluster centroids themselves from 1D (point) to 2D (line) in the 2D case.

FIG. 50 in Table 3 shows the applicable centroid types and the dimensionality of the data to support the centroid type.

Each column identifies the dimensionality of the data and the corresponding centroid types that can be used for that dimensionality of the data.

In One embodiment, a degenerate case can use a line centroid in 1D where all points belong to the single line centroid cluster. In a second embodiment, a line centroid can be a line segment of arbitrary length, i.e., a portion of a line.

By relaxing the assertion from previous embodiments where clusters cannot overlap, an embodiment of the invention in 2D, 3D, and nD creates cluster centroids that overlap only in a point, a line, or a plane.

Figure 43:
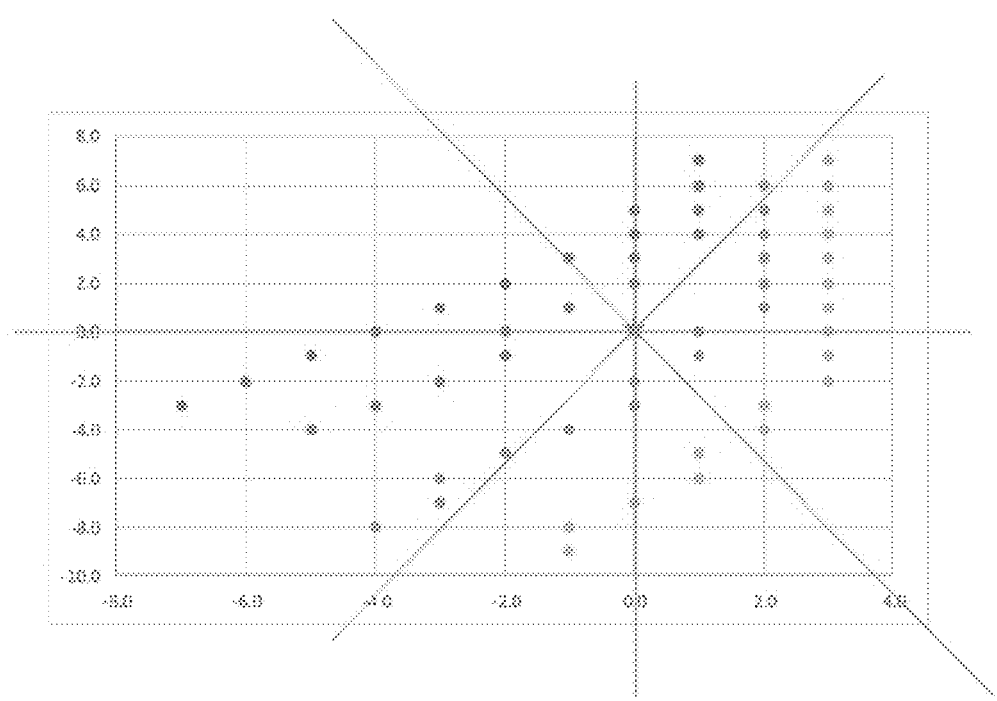
FIG. 43 shows an example four line centroids in 2D which overlap in one point according to one embodiment of the disclosure.
Figure 44:
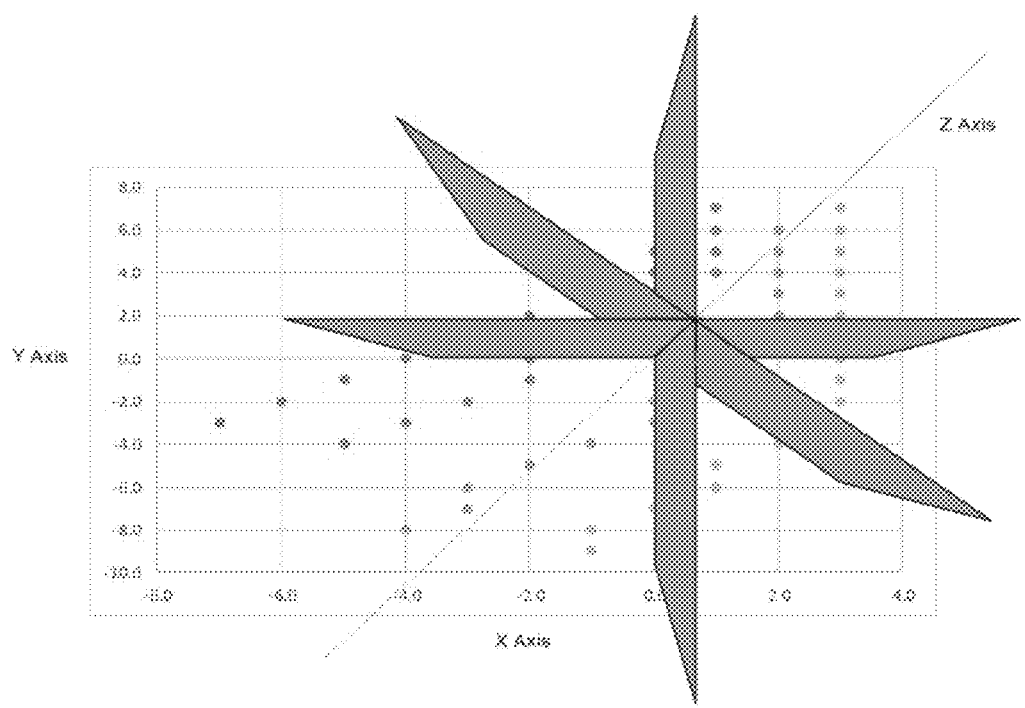
FIG. 44 shows an example of three plane centroids that overlap in one line according to one embodiment of the disclosure.

FIG. 43 shows an example four line centroids in 2D which overlap in one point. FIG. 44 shows an example of three plane centroids that overlap in one line.

For the first problem, a key decision is the dimensionality of the centroids themselves. For example in the 3D space with line centroids, the centroids can be, with equal utility, lines or planes. If the centroids are lines, they can lie on the same plane or in different planes.

Likewise, in the 3D space, parabola centroids can be parabolas or paraboloids; and similarly polynomial centroids can be polynomial curves or polynomial surfaces.

For the second problem, careful consideration must be given to rotating the points through the 3D or n-dimensional space. One embodiment uses affine transformation to rotate the points around the centroids efficiently and effectively to find the best centroid orientation.

For the third problem, extend, the distance measurement technique used in clustering between a point and point centroid to a point and polynomial centroid. Also, extend the centroid optimization phase of the clustering from point centroid optimization to polynomial centroid optimization.

Figure 45:
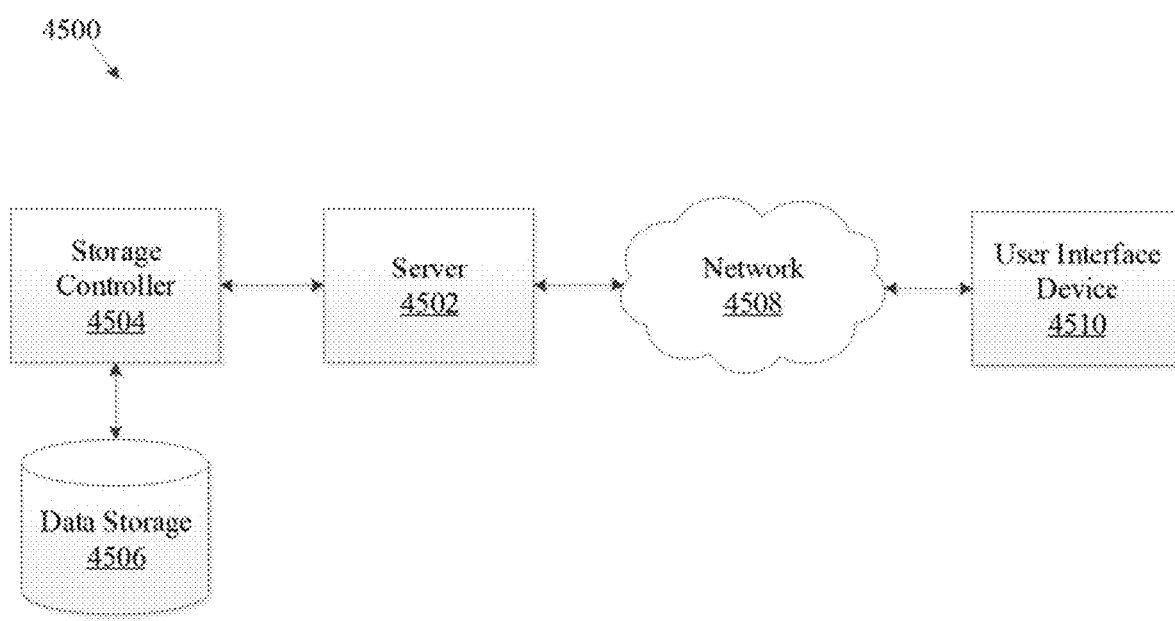
FIG. 45 illustrates a computer network 4500 for obtaining access to database files in a computing system according to one embodiment of the disclosure.

FIG. 45 illustrates a computer network 4500 for obtaining access to database files in a computing system according to one embodiment of the disclosure. The computer network 4500 may include a server 4502, a data storage device 4506, a network 4508, and a user interface device 4510. The server 4502 may also be a hypervisor-based system executing one or more guest partitions hosting operating systems with modules having server configuration information. In a further embodiment, the computer network 4500 may include a storage controller 4504, or a storage server configured to manage data communications between the data storage device 4506 and the server 4502 or other components in communication with the network 4508. In an alternative embodiment, the storage controller 804 may be coupled to the network 4508.

In one embodiment, the user interface device 4510 is referred to broadly and is intended to encompass a suitable processor-based device such as a desktop computer, a laptop computer, a personal digital assistant (PDA) or tablet computer, a smartphone or other mobile communication device having access to the network 4508. In a further embodiment, the user interface device 4510 may access the Internet or other wide area or local area network to access a web application or web service hosted by the server 4502 and may provide a user interface for enabling a user to enter or receive information.

The network 4508 may facilitate communications of data between the server 4502 and the user interface device 4510. The network 4508 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 4510 accesses the server 4502 through an intermediate sever (not shown). For example, in a cloud application the user interface device 4510 may access an application server. The application server fulfills requests from the user interface device 4510 by accessing a database management system (DBMS). In this embodiment, the user interface device 4510 may be a computer or phone executing a Java application making requests to a JBOSS server executing on a Linux server, which fulfills the requests by accessing a relational database management system (RDMS) on a mainframe server.

Figure 46:
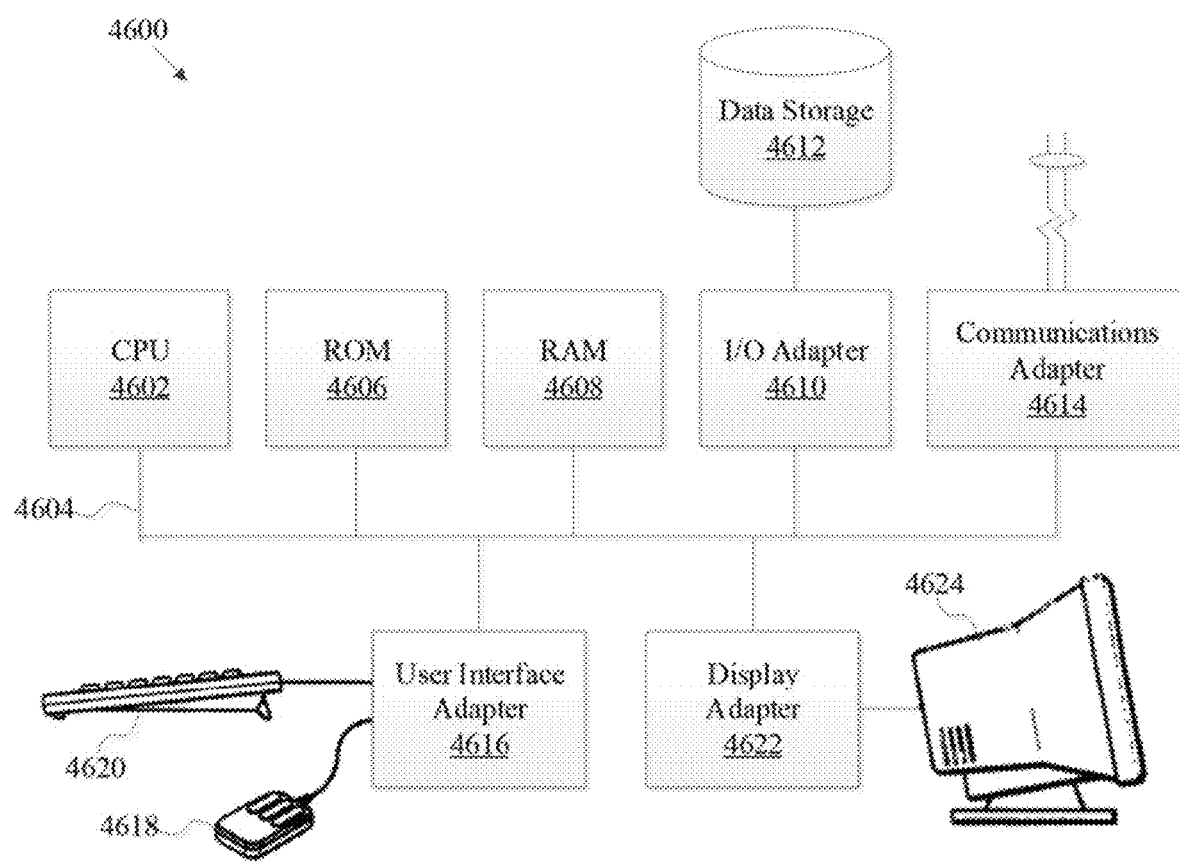
FIG. 46 illustrates a computer system 4600 adapted according to certain embodiments of the server 4502 and/or the user interface device 4510.

FIG. 46 illustrates a computer system 4600 adapted according to certain embodiments of the server 4502 and/or the user interface device 4510. The central processing unit ("CPU") 4602 is coupled to the system bus 4604. The CPU 4602 may be a general purpose CPU or microprocessor, graphics processing unit ("GPU"), and/or microcontroller. The present embodiments are not restricted by the architecture of the CPU 4602 so long as the CPU 4602, whether directly or indirectly, supports the operations as described herein. The CPU 4602 may execute the various logical instructions according to the present embodiments.

The computer system 4600 may also include random access memory (RAM) 4608, which may be synchronous RAM (SRAM), dynamic RAM (DRAM), synchronous dynamic RAM (SDRAM), or the like. The computer system 4600 may utilize RAM 4608 to store the various data structures used by a software application. The computer system 4600 may also include read only memory (ROM) 4606 which may be PROM, EPROM, EEPROM, optical storage, or the like. The ROM may store configuration information for booting the computer system 4600. The RAM 4608 and the ROM 4606 hold user and system data, and both the RAM 4608 and the ROM 4606 may be randomly accessed.

The computer system 4600 may also include an I/O adapter 4610, a communications adapter 4614, a user interface adapter 4616, and a display adapter 4622. The I/O adapter 4610 and/or the user interface adapter 4616 may, in certain embodiments, enable a user to interact with the computer system 4600. In a further embodiment, the display adapter 4622 may display a graphical user interface (GUI) associated with a software or web-based application on a display device 4624, such as a monitor or touch screen.

The I/O adapter 4610 may couple one or more storage devices 4612, such as one or more of a hard drive, a solid state storage device, a flash drive, a compact disc (CD) drive, a floppy disk drive, and a tape drive, to the computer system 4600. According to one embodiment, the data storage 4612 may be a separate server coupled to the computer system 4600 through a network connection to the I/O adapter 4610. The communications adapter 4614 may be adapted to couple the computer system 4600 to the network 4508, which may be one or more of a LAN, WAN, and/or the Internet. The user interface adapter 4616 couples user input devices, such as a keyboard 4620, a pointing device 4618, and/or a touch screen (not shown) to the computer system 4600. The display adapter 4622 may be driven by the CPU 4602 to control the display on the display device 4624. Any of the devices 4602-4622 may be physical and/or logical.

The applications of the present disclosure are not limited to the architecture of computer system 4500. Rather the computer system 4600 is provided as an example of one type of computing device that may be adapted to perform the functions of the server 4502 and/or the user interface device 4610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 4600 may be virtualized for access by multiple users and/or applications.

Figure 47A:
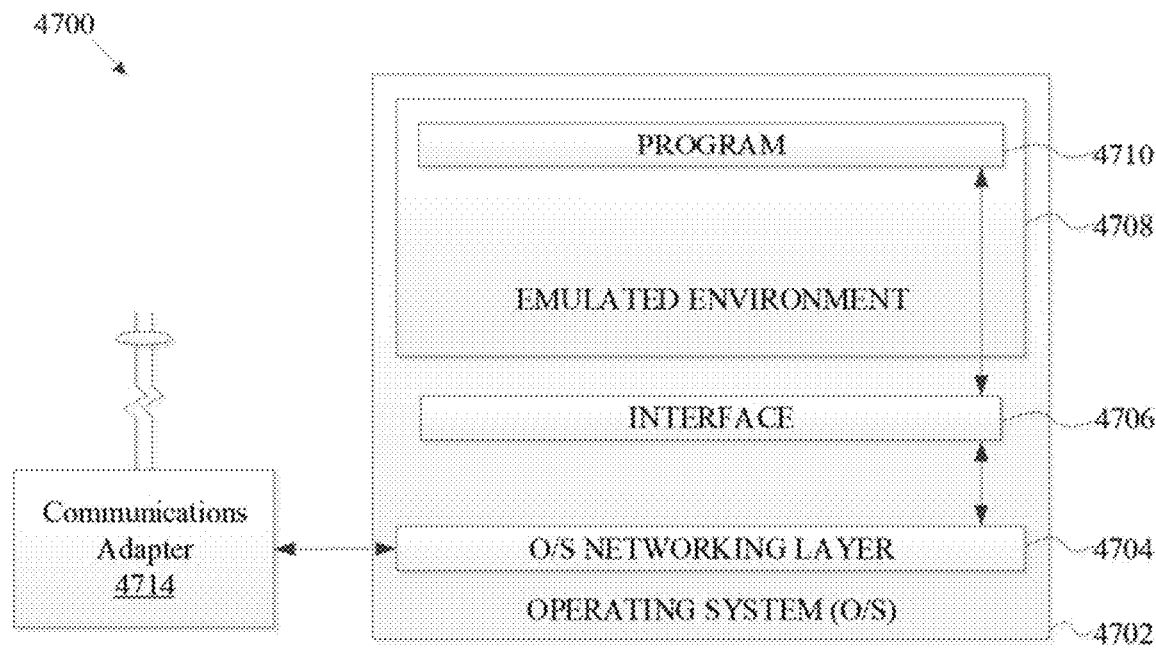
FIG. 47A is a block diagram illustrating a server hosting an emulated software environment for virtualization according to one embodiment of the disclosure.

FIG. 47A is a block diagram illustrating a server 4700 hosting an emulated software environment for virtualization according to one embodiment of the disclosure. An operating system 4702 executing on a server 4700 includes drivers for accessing hardware components, such as a networking layer 4704 for accessing the communications adapter 4714. The operating system 4702 may be, for example, Linux or Windows. An emulated environment 4708 in the operating system 4702 executes a program 4710, such as Communications Platform (CPComm) or Communications Platform for Open Systems (CPCommOS). The program 4710 accesses the networking layer 4704 of the operating system 4702 through a non-emulated interface 4706, such as extended network input output processor (XNIOP). The non-emulated interface 4706 translates requests from the program 4710 executing in the emulated environment 4708 for the networking layer 4704 of the operating system 4702.

Figure 47B:
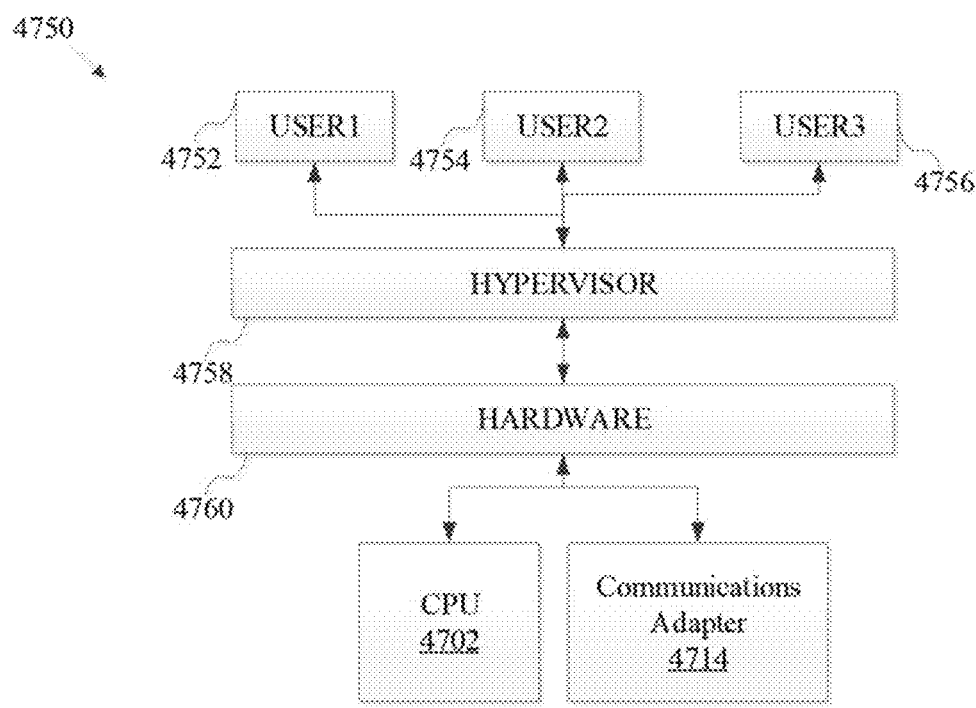
FIG. 47B is a block diagram illustrating a server hosting an emulated hardware environment according to one embodiment of the disclosure.

In another example, hardware in a computer system may be virtualized through a hypervisor. FIG. 47B is a block diagram illustrating a server 4750 hosting, an emulated hardware environment according to one embodiment of the disclosure. Users 4752, 4754, 4756 may access the hardware 4760 through a hypervisor 4758. The hypervisor 4758 may be integrated with the hardware 4758 to provide virtualization of the hardware 4758 without an operating system, such as in the configuration illustrated in FIG. 47A. The hypervisor 4758 may provide access to the hardware 4758, including the CPU 4602 and the communications adaptor 4714.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A traffic monitoring system, comprising
   a camera having a field of vision including a first car moving on a first path and at least a portion of the first path; and
   a computing system, the computing system receiving a plurality of images from the camera, the computing system having a processor, when instructed, the processor performs
      circling a perimeter of the first car on each of the images with a first rectangle;
      composing a first set of points, each point of the first set of points representing a center of the first rectangle;
      finding a first centroid using the first set of points, wherein the first centroid represents the first path and is selected from a plurality of potential centroid candidates, the first centroid produces a least summation of distances between the first centroid and the first set of points compared to other members of the plurality of potential centroid candidates; and
      calculating a speed of the first car using the first centroid.

2. The traffic monitoring system according to claim 1, wherein the first centroid is one selected from a point, a straight line, a curved line, and a plane.

3. The traffic monitoring system according to claim 2, when the first centroid is a curved line, the first centroid is parabolic or polynominal.

4. The traffic monitoring system according to claim 1, wherein the images are taken by the camera with a fixed time interval.

5. The traffic monitoring system according to claim 4, wherein a first speed of the first car is calculated using the fixed time interval.

6. A monitoring system comprising
   a camera having a field of vision including a first car moving on a first path and at least a portion of the first path; and
   a computing system, the computing system receiving a plurality of images from the camera, the computing system having a processor, when instructed, the processor performs:
      circling a perimeter of the first car on each of the images with a first rectangle;

composing a first set of points, each point of the first set of points representing a center of the first rectangle;

finding a first centroid using the first set of points, wherein the first centroid represents the first path and includes a slop parameter and a shift parameter; and calculating a speed of the first car using the first centroid.

7. The traffic monitoring system according to claim 6, wherein the slope parameter and the shift parameter are set as to produce a least summation of distances between the first centroid and the first set of points.

8. The traffic monitoring system according to claim 6, wherein the first centroid is one selected from a point, a straight line, a curved line, and a plane.

9. The traffic monitoring system according to claim 8, when the first centroid is a curved line, the first centroid is parabolic or polynominal.

10. The traffic monitoring system according to claim 6, wherein the images are taken by the camera with a fixed time interval.

11. The traffic monitoring system according to claim 10, wherein a first speed of the first car is calculated using the fixed time interval.

12. A traffic monitoring system, comprising
  a camera having a field of vision including a first car moving on a first path and a second car moving on a second path and at least a portion of the first path; and
  a computing system, the computing system receiving a plurality of images from the camera, the computing system having a processor, when instructed, the processor performs
    circling a perimeter of the first car on each of the images with a first rectangle;
    composing a first set of points, each point of the first set of points representing a center of the first rectangle;
    finding a first centroid using the first set of point, wherein the first centroid represents the first path;
    finding a second centroid representing the second path and wherein a distance between the first centroid and the second centroid is set at 12 feet; and
    calculating a speed of the first car using the first centroid.

13. The traffic monitoring system according to claim 12, wherein the first centroid is one selected from a point, a straight line, a curved line, and a plane.

14. The traffic monitoring system according to claim 13, when the first centroid is a curved line, the first centroid is parabolic or polynominal.

15. The traffic monitoring system according to claim 12, wherein the images are taken by the camera with a fixed time interval.

16. The traffic monitoring system according to claim 15, wherein a first speed of the first car is calculated using the fixed time interval.

17. The traffic monitoring system according to claim 12, wherein finding a second centroid includes
  circling a perimeter of the second car on each of the images with a second rectangle;
  composing a second set of points, each point of the second set of points representing a center of the second rectangle;
  finding a second centroid using the second set of points, wherein the second centroid represents the second path; and
  calculating a speed of the second car using the first centroid.

* * * * *